US012267895B2

(12) United States Patent
Tenny et al.

(10) Patent No.: US 12,267,895 B2
(45) Date of Patent: Apr. 1, 2025

(54) SECURITY MECHANISM FOR CONNECTION ESTABLISHMENT OVER MULTI-HOP SIDELINKS

(71) Applicant: MEDIATEK SINGAPORE PTE. LTD., Singapore (SG)

(72) Inventors: Nathan Edward Tenny, San Jose, CA (US); Yuan-Chieh Lin, Hsinchu (TW); Ming-Yuan Cheng, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 190 days.

(21) Appl. No.: 17/832,976

(22) Filed: Jun. 6, 2022

(65) Prior Publication Data

US 2023/0007710 A1    Jan. 5, 2023

Related U.S. Application Data

(60) Provisional application No. 63/217,820, filed on Jul. 2, 2021.

(51) Int. Cl.
*H04W 76/14* (2018.01)
*H04W 12/041* (2021.01)
(Continued)

(52) U.S. Cl.
CPC ......... *H04W 76/14* (2018.02); *H04W 12/041* (2021.01); *H04W 12/06* (2013.01);
(Continued)

(58) Field of Classification Search
CPC . H04W 76/14; H04W 12/106; H04W 12/041; H04W 12/06; H04W 12/08
See application file for complete search history.

(56) References Cited

U.S. PATENT DOCUMENTS

| 2020/0221298 A1 | 7/2020 | Pan et al. |
| 2021/0051473 A1 | 2/2021 | Escott et al. |
| 2021/0345104 A1* | 11/2021 | Cheng ............... H04W 12/0433 |

FOREIGN PATENT DOCUMENTS

| CN | 104604270 A | 1/2013 |
| CN | 109716810 A | 3/2017 |
| WO | WO 2021/092384 A1 | 5/2021 |

OTHER PUBLICATIONS

3GPP (TR 23.703 V12.0.0, Feb. 2014, 324 pages) (Year: 2014).*
(Continued)

*Primary Examiner* — Oleg Korsak
(74) *Attorney, Agent, or Firm* — Helen Mao; Zheng Jin; Imperium Patent Works

(57) ABSTRACT

A method of a relay user equipment (UE) can include receiving, at the relay UE, from a first neighbor UE, a communication request message for establishing a connection between an initiating UE and a target UE, the communication request message including first security-establishment-related information originating from the initiating UE for establishing a security association between the initiating UE and the target UE; modifying the communication request message to add second security-establishment-related information for establishing a security association between the relay UE and a second neighbor UE; and transmitting to the second neighbor UE the modified communication request message that includes the first security-establishment-related information originating from the initiating UE for establishing the security association between the initiating UE and the target UE, and the second security-establishment-related information added by the relay UE for establishing the security association between the relay UE and the second neighbor UE.

20 Claims, 13 Drawing Sheets

(51) Int. Cl.
*H04W 12/06* (2021.01)
*H04W 12/08* (2021.01)
*H04W 12/106* (2021.01)
*H04W 88/04* (2009.01)

(52) U.S. Cl.
CPC ......... *H04W 12/08* (2013.01); *H04W 12/106* (2021.01); *H04W 88/04* (2013.01)

(56) References Cited

OTHER PUBLICATIONS

China Intellectual Property Office Action notice of allowance 202210731273.8, dated Apr. 29, 2024.
Taiwanese Office Action Issued on Feb. 1, 2023 in Taiwanese patent Application No. 111124169, 11 pages.

* cited by examiner

SECURITY MECHANISM FOR CONNECTION ESTABLISHMENT OVER MULTI-HOP SIDELINKS

INCORPORATION BY REFERENCE

This present application claims the benefit of U.S. Provisional Application No. 63/217,820, "Discovery and Connection Establishment with Security in a Wireless Mesh Network" filed on Jul. 2, 2021, which is incorporated herein by reference in its entirety.

TECHNICAL FIELD

The present disclosure relates to wireless communications and specifically relates to multi-hop sidelink communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The 3rd Generation Partnership Project (3GPP) has developed sidelink techniques to support direct communications among wireless devices without traversing a mobile network. For example, a group of wireless devices may form a mesh network. Intermediary devices can relay messages between two remote peer devices using the sidelink techniques. As a result, cars, robots and even consumer gadgets could create their own ad hoc networks without using the radio access network as an intermediary.

SUMMARY

Aspects of the disclosure provide a method of a relay user equipment (UE). The method can include receiving, at the relay UE, from a first neighbor UE, a communication request message for establishing a connection between an initiating UE and a target UE, the communication request message including first security-establishment-related information originating from the initiating UE for establishing a security association between the initiating UE and the target UE; modifying the communication request message to add second security-establishment-related information for establishing a security association between the relay UE and a second neighbor UE; and transmitting to the second neighbor UE the modified communication request message that includes the first security-establishment-related information originating from the initiating UE for establishing the security association between the initiating UE and the target UE, and the second security-establishment-related information added by the relay UE for establishing the security association between the relay UE and the second neighbor UE.

In an embodiment, the first neighbor UE is the initiating UE, and the method further can further include performing an authentication based on the first security-establishment-related information originating from the initiating UE to determine a root key for communications between the first neighbor UE and the relay UE, and initiating a security mode control process based on the first security-establishment-related information originating from the initiating UE to establish a security association between the first neighbor UE and the relay UE.

In an embodiment, the communication request message includes third security-establishment-related information originating from the first neighbor UE for establishing a security association between the first neighbor UE and the relay UE. The modifying can include replacing the third security-establishment-related information originating from the first neighbor UE with the second security-establishment-related information for establishing the security association between the relay UE and the second neighbor UE.

In an example, the method can further include performing an authentication based on the third security-establishment-related information originating from the first neighbor UE to determine a root key for communications between the first neighbor UE and the relay UE, and initiating a security mode control process based on the third security-establishment-related information originating from the first neighbor UE to establish a security association between the first neighbor UE and the relay UE.

In an embodiment, the method can further include, in response to receiving a request of a security mode control process from the second neighbor UE, initiating a security mode control process to establish a security association between the first neighbor UE and the relay UE based on one of the first security-establishment-related information originating from the initiating UE, and the third security-establishment-related information originating from the first neighbor UE and included in the communication request message.

In some embodiments, the first security-establishment-related information originating from the initiating UE includes first user information of the initiating UE, a first nonce generated at the initiating UE, and a first signature covering the first user information of the initiating UE and the first nonce generated at the initiating UE, and the second security-establishment-related information added by the relay UE includes second user information of the relay UE, a second nonce generated at the relay UE, and a second signature covering the second user information of the relay UE and the second nonce generated at the relay UE.

In an embodiment, the communication request message includes third security-establishment-related information originating from the first neighbor UE for establishing a security association between the first neighbor UE and the relay UE. The third security-establishment-related information originating from the first neighbor UE includes third user information of the first neighbor UE, a third nonce generated at the first neighbor UE, and a third signature covering the third user information of the first neighbor UE and the third nonce generated at the first neighbor UE. The modifying can include replacing the third nonce and the third signature covering the third user information of the first neighbor UE and the third nonce with the second nonce and the second signature covering the second user information of the relay UE and the second nonce.

In an embodiment, the method can further include authenticating the first neighbor UE based on one of the first signature covering the first user information of the initiating UE and the first nonce generated at the initiating UE, and a third signature covering a third user of the first neighbor UE and a third nonce generated at the first neighbor UE.

In an embodiment, the method can further include transmitting to the first neighbor UE a security mode command message that includes a root key for communications between the first neighbor UE and the relay UE, a fourth nonce generated at the relay UE for a connection between the first neighbor UE and the relay UE, and a fourth signature covering the fourth nonce generated at the relay UE for the connection between the first neighbor UE and the relay UE.

In an example, the method can further include deriving a session key for the connection between the first neighbor UE and the relay UE based on the root key for communications between the first neighbor UE and the relay UE, the fourth nonce generated at the relay UE for the connection between the first neighbor UE and the relay UE, and one of the first nonce generated at the initiating UE and a third nonce generated at the first neighbor UE.

In an embodiment, the method can further include receiving from the second neighbor UE a security mode command message that includes a root key for communications between the second neighbor UE and the relay UE, a fifth nonce generated at the second neighbor UE for a connection between the second neighbor UE and the relay UE, and a fifth signature covering the fifth nonce generated at the second neighbor UE for the connection between the second neighbor UE and the relay UE; and authenticating the second neighbor UE based on the fifth signature covering the fifth nonce generated at the second neighbor UE for the connection between the second neighbor UE and the relay UE. In an example, the method further include deriving a session key for the connection between the second neighbor UE and the relay UE based on the root key for communications between the second neighbor UE and the relay UE, the fifth nonce generated at the second neighbor UE for the connection between the second neighbor UE and the relay UE, and the second nonce generated at the relay UE.

In an embodiment, the second neighbor UE is the target UE.

Aspects of the disclosure can further provide a method of a target UE. The method can include receiving, at the target UE from a relay UE, a communication request message for establishing a connection between an initiating UE and the target UE via the relay UE, the communication request message including first security-establishment-related information initiated from the initiating UE for establishing a security association between the initiating UE and the target UE, and second security-establishment-related information originating from the relay UE for establishing a security association between the relay UE and the target UE; establishing a secure connection between the relay UE and the target UE based on the second security-establishment-related information originating from the relay UE; performing an authentication based on the first security-establishment-related information originating from the initiating UE to determine a root key for communications between the initiating UE and the target UE: and initiating a security mode control process with the initiating UE based on the first security-establishment-related information originating from the initiating UE to establish a security association between the initiating UE and the target UE, wherein a security mode control command message for the initiating UE is transmitted to the relay UE over the secure connection between the relay UE and the target UE.

In an embodiment, the first security-establishment-related information originating from the initiating UE includes a first user information of the initiating UE, a first nonce generated at the initiating UE, and a first signature covering the first user information of the initiating UE and the first nonce generated at the initiating UE, and the second security-establishment-related information originating from the relay UE includes second user information of the relay UE, a second nonce generated at the relay UE, and a second signature covering the second user information of the relay UE and the second nonce generated at the relay UE.

In an example, the establishing includes authenticating the relay UE based on the second signature covering the second user information of the relay UE and the second nonce generated at the relay UE: determining a root key for communications between the relay UE and the target UE; determining a session key for the secure connection between the relay UE and the target UE based on the second nonce generated at the relay UE, a third nonce generated at the target UE, and the root key: and transmitting to the relay UE a security mode control command message that includes the third nonce generated at the target UE, a third signature covering the third nonce generated at the target UE, and the root key that is encrypted.

In an example, the performing the authentication includes authenticating the initiating UE based on the first signature covering the first user information of the initiating UE and the first nonce generated at the initiating UE; and determining a root key for communications between the initiating UE and the target UE.

In an example, the security mode control command message for the initiating UE includes a fourth nonce generated at the target UE, a fourth signature covering the fourth nonce generated at the target UE, and the root key that is encrypted.

In an example, the method further include determining a session key for a connection between the initiating UE and the target UE based on the first nonce generated at the initiating UE, the fourth nonce generated at the target UE, and the root key for communications between the initiating UE and the target UE.

Aspects of the disclosure can further provide a relay UE comprising circuitry. The circuitry can be configured to receive, at the relay UE, from a first neighbor UE, a communication request message for establishing a connection between an initiating UE and a target UE, the communication request message including first security-establishment-related information originating from the initiating UE for establishing a security association between the initiating UE and the target UE; modify the communication request message to add second security-establishment-related information for establishing a security association between the relay UE and a second neighbor UE; and transmit to the second neighbor UE the modified communication request message that includes the first security-establishment-related information originating from the initiating UE for establishing the security association between the initiating UE and the target UE, and the second security-establishment-related information added by the relay UE for establishing the security association between the relay UE and the second neighbor UE.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
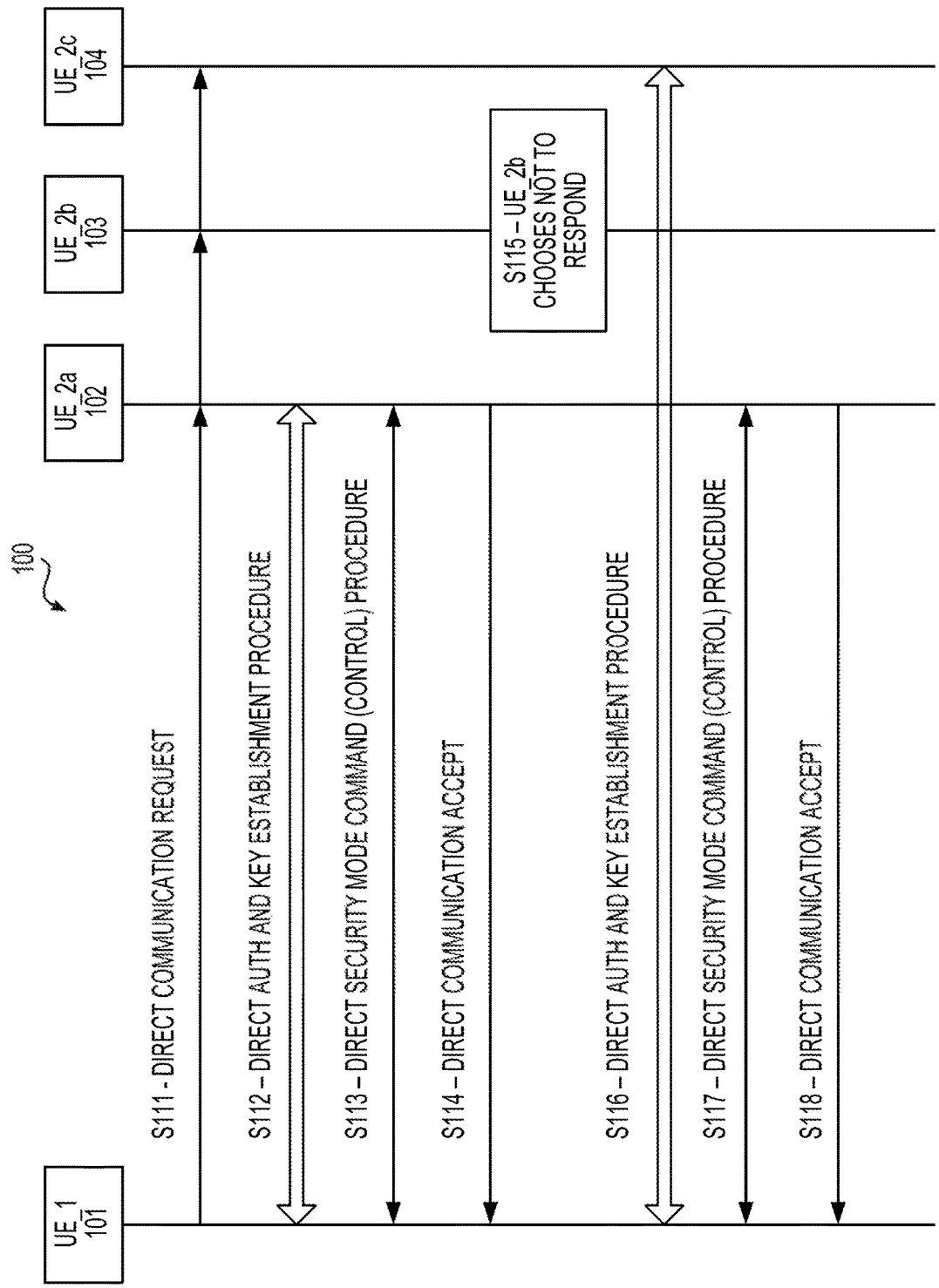
FIG. 1 shows an example of a peer-to-peer process 100 for connection setup and security establishment without network involvement. 10025J

This disclosure describes methods of establishing a secured connection between two remote UEs, traversing one or more intervening relay UEs. The methods may be applied to a UE-to-UE relay environment, or more generally to a mesh network environment in which multiple UEs relay information dynamically for one another.

In a peer-to-peer communication environment, a pair of communicating devices can establish a security relationship in order to communicate safely with encryption and integrity protection. This setting is different from network-based cellular communication, where the network controls the establishment of security and can distribute the security configuration (for example, key information) to any number of mobile devices. This network-based process generally depends on the existence of a shared secret between the mobile device and the subscriber's home network. In the peer-to-peer setting, it may not be known in advance what pairs of devices need to communicate; it is desirable that security can be established without depending on an a priori shared secret between the two communicating devices.

For example, in 3GPP specifications for peer-to-peer communication, an "identity-based" key generation scheme is used, allowing the concerned UEs to develop a shared key for securing the connection between them without depending on a previously shared secret. A public-key security scheme is used, in which a first peer device (UE_1) computes the public key of a second peer device (UE_2) based on the identity of UE_2 and a common public key associated with a key server. In other examples, authentication schemes other than the identity-based key generation scheme can be employed. The present disclosure is not limited to any specific authentication or encryption mechanisms.

In a UE-to-UE relaying or mesh network environment, where two UEs (UE_1 and UE_2) communicate via at least one intermediary "relay" UE (UE_R), there is a need to establish end-to-end security between UE_1 and UE_2, such that their communication is secure against monitoring or tampering at UE_R as well as from external third parties. This disclosure is directed to methods of establishing security when a UE-to-UE connection is established with one or more intermediary relay UEs.

In order to establish a secure relayed connection between two remote UEs UE_1 and UE_2, traversing a relay UE UE_R1, key generation information can be provided for the direct connections (between UE_1 and UE_R1, and between UE_R1 and UE_2) and the indirect connection (between UE_1 and UE_2). Furthermore, each "hop" in the sequence of UEs can allow mutual authentication of the participating UEs, while also preserving the needed information for end-to-end authentication between UE_1 and UE_2. This disclosure describes methods of signalling at connection establishment that allow the involved UEs to generate the needed keys and perform the needed authentications.

The establishment of a secure connection in the LTE or NR sidelink depends on the ability of a pair of UEs UE_1 and UE_2 to authenticate one another and establish a security association without any real-time involvement from the network. This restriction is because UE_1 and UE_2 may establish a connection with one another while out of network coverage. Of course, depending on the configuration, UEs may opt to adopt any suitable authentication and security establishment methods that do not rely on the network even when the UEs are within the network coverage.

FIG. 1 shows an example of a peer-to-peer process 100 for connection setup and security establishment without network involvement. At S111, UE_1 101 initiates the connection with a Direct Communication Request message, which may be received by multiple peer UEs: UE_2a 102, UE_2b 103, and UE_2c 104. A peer UE with an interest in communicating with UE_1 responds by triggering security procedures, followed by a Direct Communication Accept message that finishes the procedure to establish a connection.

For example, at S112, UE_2a 102 chooses to respond to the Direct Communication Request message and may initiate a Direct Authentication (Auth) and Key Establishment procedure to generate a root key for communications between UE_1 101 and UE_2a 102. At S113, UE_2a 102 runs a Direct Security Mode Command (or control) procedure with UE_1 101 to establish a security association between UE_1 101 and UE_2a 102. At S114, UE_2a 102 sends a Direct Communication Accept message when the security association is established successfully. At S115, UE_2b 103 chooses not to respond UE_1 101. From S116 to S118, UE_2c 104 responds to UE_1 101 using the same sequence of procedures and messages as UE_2a 102.

In the process 100, when each responder decides to activate security comprising signalling integrity protection and/or signalling confidentiality protection, each responder establishes a different security context with UE_1 101 that is not known to the other UEs. For example, the security context used between UE_1 101 and UE_2a 102 is not known to UE_2b 103 and UE_2c 104. The Direct Communication Request can be sent unprotected and only contains enough security-establishment-related information for a secure connection to be established with the other UE. Other information UE_1 101 needs to send to the other UEs in order to establish the connection can be included in a Direct Security Mode Complete message (sent as part of the Direct Security Mode procedure) from UE_1 101. The Direct Security Mode Complete message can be both confidentiality and integrity protected.

Figure 2:
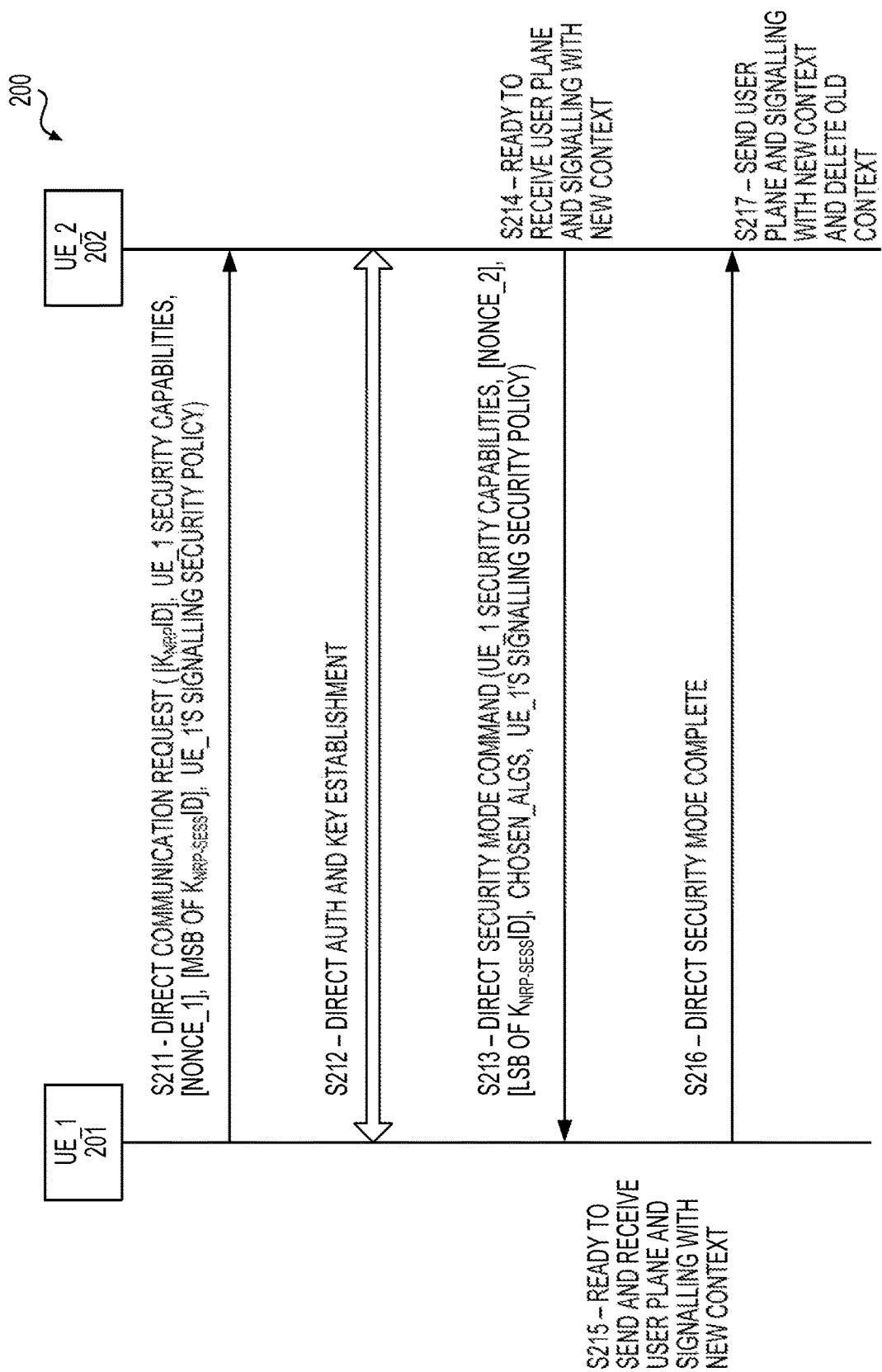
FIG. 2 shows an example of a security establishment process 200 between UE_1 201 (UE 201) and UE_2 202 (UE 202) over an NR sidelink crossing a PC5 reference point.

FIG. 2 shows an example of a security establishment process 200 between UE_1 201 (UE 201) and UE_2 202 (UE 202) over an NR sidelink crossing a PC5 reference point. The process 200 can be part of a connection setup process (such as the process 100 in the FIG. 1 example) for establishing a secure connection between UE 201 and UE 202.

At S211, triggered by an event (such as an indication from an application, for example) at the UE 201, UE 201 transmits a Direct Communication Request message (also referred to as a Direct Link Establishment Request message) to UE 202. The message can include security-establishment-related information and possibly other parameters. For example, the security-establishment-related information can include:

- the security capabilities of UE 201 indicating a list of algorithms that UE 201 supports for the security establishment of the connection;
- the signalling security policy of UE 201 corresponding to the application or desired service;
- a Nonce_1, for example, set to a 128-bit nonce value generated by UE 201 for the purpose of session key $K_{NRP-sess}$ generation for the connection, where NRP stands for NR PC5 (in some embodiments, a different notation may be used; for example, the abbreviation NRP may be replaced by a D standing for Direct);
- the most significant bits (MSB) (for example, 8 bits) of a $K_{NRP-sess}$ ID;
- possibly other parameters.

The security-establishment-related information can include a root key ID, $K_{NRP}$ ID, if UE 201 has an existing root key $K_{NRP}$ for the connection with UE 202. The absence of the $K_{NRP}$ ID parameter can indicate the UE 201 does not have a $K_{NRP}$ for UE 202. The security-establishment-related information can further include IDs (for example, UE's application layer ID) of the initiating UE 201 and the target UE 202.

The security-establishment-related information can further include a key establishment information (Key_Est_Info) container. In various examples, different long-term credentials and associated authentication methods can be employed to establish keys to protect a connection. Corresponding to a specific authentication method, the related parameters can be contained in Key_Est_Info containers and exchanged between two peer UEs. For example, Key_Est_Info containers can be transmitted in the steps of S211, S212, and S213. In some examples, identity-based authentication and encryption schemes are used. The signatures and root keys can be carried in respective Key_Est_Info containers.

At S212, UE 202 can initiate a Direct Authentication (Auth) and Key Establishment procedure between UE 201 and UE 202. During the Direct Authentication and Key Establishment procedure, UE 101 and UE 102 perform mutual authentication and derive a new root key ($K_{NRP}$) shared between UE 101 and UE 102. Depending on the specific authentication method employed, the Direct Authentication and Key Establishment procedure can be performed in different ways. For example, multiple rounds of interactions between UE 201 and UE 202 are possible for some authentication methods. In an example, when an identity-based authentication and encryption scheme is used, UE 202 can derive a root key at S212 based on the security-establishment-related information transmitted in S211. Thus, there is no interaction between UE 201 and UE 202 at 212.

For example, UE 201 and UE 202 can each be configured with long term credentials. The credentials may include symmetric key(s) or public/private key pair depending on the particular use case and authentication method employed. A root key $K_{NRP}$ (for example, 256 bits long) can be derived based on the credentials during the step of S212 using the respective authentication method. For different applications at UE 201, different root keys may be derived.

From S213 to S217, a security mode control procedure can be performed between UE 201 and UE 202. As a result of this security mode control procedure, selected algorithms and keys can be determined and derived and subsequently used to integrity protect and cipher signalling messages and/or user-plane data exchanged between UE 201 and UE 202.

At S213, UE 202 can generate a Nonce_2 value, for example, with a length of 128 bits. UE 202 can derive a session key, $K_{NRP-sess}$, from the root key $K_{NRP}$, Nonce_2 and Nonce_1 (received from UE 201 at S211). Based on the session key, UE 202 can derive an encryption key (such as a NR PC5 Encryption Key (NRPEK)) and an integrity key (such as a NR PC5 Integrity Key (NRPIK)) based on selected encryption and integrity protection algorithms.

UE 202 can create a Direct Security Mode Command message. UE 202 can transmit the message to UE 201 to initiate the security mode control procedure. The message can contain the MSB of the $K_{NRP}$ ID if $K_{NRP}$ is newly generated at UE 202. Depending on the employed authentication method, the message can include a Key_Est_Info container for transmitting related information which UE 201 can use to generate $K_{NRP}$. In an example, the Key_Est_Info container can be used to carry a signature of UE 202 and an encrypted root key. The message can further include: the chosen algorithms for confidentiality and integrity protection; the security capabilities and signalling security policy of UE 201; the Nonce_2; and the LSB of $K_{NRP-sess}$ ID.

In an example, the message exchanges in the process 200 can take place at a PC5 signalling (PC5-S) protocol layer in a control-plane NR sidelink protocol stack. An application layer above the PC5-S protocol layer can prepare the content for the messages exchanged at the PC5-S protocol layer. A lower layer, such as a Packet Data Convergence Protocol (PDCP) layer, can serve as a transport layer for transmitting the messages of the PC5-S protocol layer. Under such a configuration, at S213, UE 202 can provide to the lower layer with a new security context. The security context can include the $K_{NRP-sess}$, the encryption key NRPEK, the integrity key NRPIK and the related confidentiality and integrity algorithms, for example. The UE 202 may indicate to the lower layer that the Direct Security Mode Command message can be integrity protected with the new security context and the signalling messages can be received using the new security context.

At S214, UE 202 is ready to receive user plane data and signalling with the new security context for the connection between UE 201 and UE 202.

At S215, in response to receiving the Direct Security Mode Command message, UE 201 can derive $K_{NRP-sess}$ from $K_{NRP}$, Nonce_1 and Nonce_2 received from UE 202. The $K_{NRP}$ can be derived locally or received from UE 202, depending on the specific authentication method employed. UE 201 can provide a new security context to the lower layer and indicate to the lower layer that signalling and user data can be protected using the new security context. At the current stage, UE 201 is ready to send and receive user plane data and signalling with the new security context.

At S216, UE 201 can transmit a Direct Security Mode Complete message to inform UE 202 of the completion of the security mode control process. At S217, UE 202 is ready to send user-plane data and signalling with the new security context. In case an old security context exists, UE 202 may delete the old security context. For example, UE 202 can send an integrity protected and confidentiality protected Direct Communication Accept message to UE 201 with the new security context. The process 200 can terminate thereafter.

Figure 3:
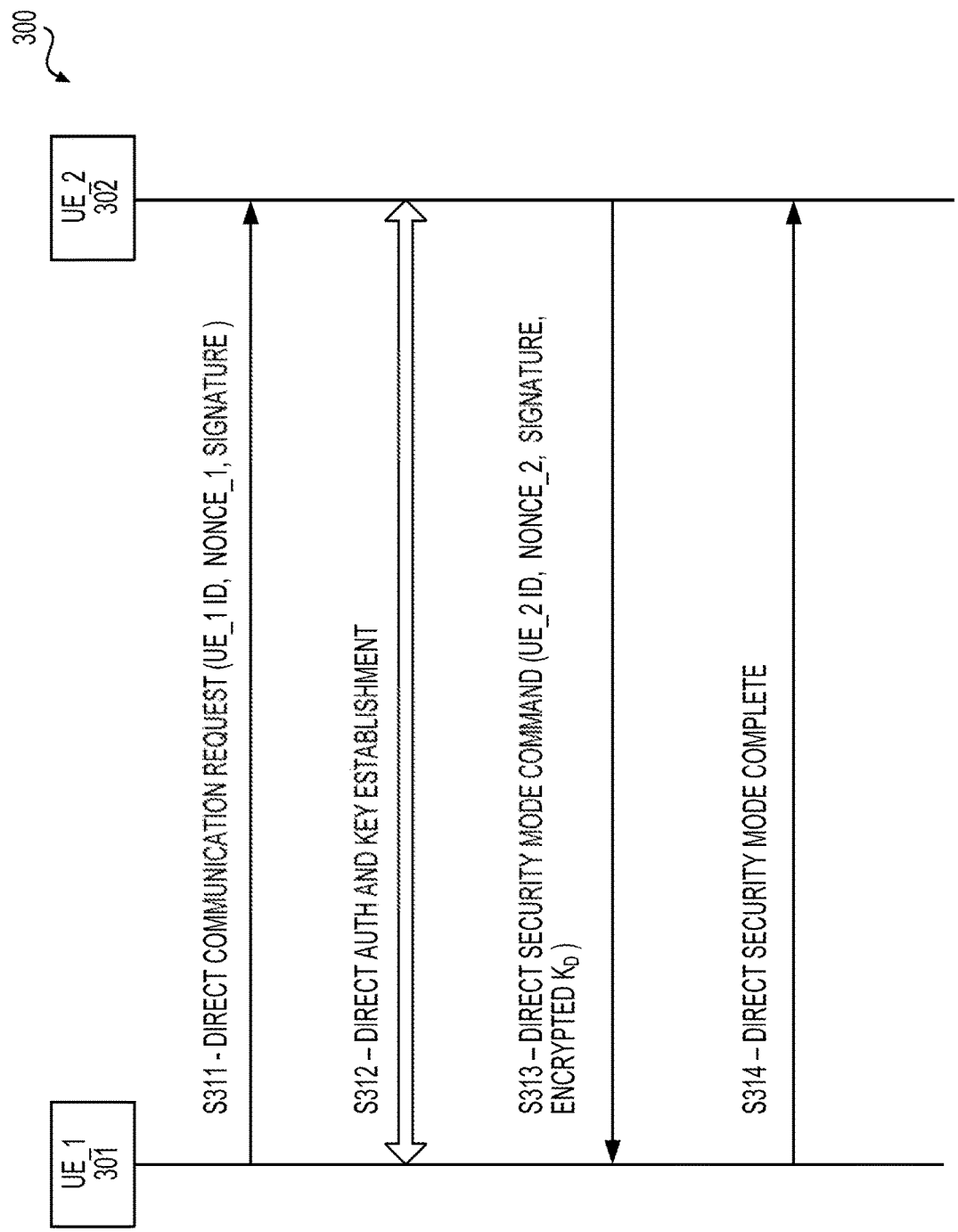
FIG. 3 shows another example of a security establishment process 300 between UE_1 301 (UE 301) and UE_2 302 (UE 302) over an LTE sidelink PC5 reference point.

FIG. 3 shows another example of a security establishment process 300 between UE_1 301 (UE 301) and UE_2 302 (UE 302) over an LTE sidelink PC5 reference point. The process 300 can be part of a connection setup process (such as the process 100 in the FIG. 1 example) for establishing a secure connection between UE 301 and UE 302. The process 300 can have a similar structure as the process 200. For example, similar steps are included in both the process 300 and 200. However, the respective messages of the two processes may contain different parameters. For example, some parameters can be related with an identity-based authentication and encryption scheme.

At S311, UE 301 transmits a Direct Communication Request message. The message can include security-establishment-related information and possibly other parameters. For example, the security-establishment-related information can include a UE_1 ID, a Nonce_1, and a signature. The signature can be generated based on the UE_1 ID and the Nonce_1 and thus can cover the UE_1 ID and the Nonce_1. In other examples, user information (also referred to as user ID related information, user ID information, or user related information) of UE 301 can be carried in the message instead of the UE_1 ID. A UE ID can be determined based on the user information and subsequently used, for example, for obtaining a long term key. For example, the user information can provide or be used to derive a UE ID (an UE identity or identifier). Such a UE ID can be used in an identity-based authentication and encryption mechanism to determine a public key. A set of credentials associated with such a UE ID (for example as defined in RFC 6507 or RFC 6508), can be configured to the respective UE. In some examples, the user information is carried in a User Info information element (IE) in the Direct Communication Request message. In some examples, such a UE ID may be encoded in any format that is compatible with the guidelines provided in RFC 6509. For example, such a UE ID may be a concatenation of a fixed part (in the form of an international mobile subscriber identity (IMSI), a SIP UR1 (a Uniform Resource Identifier (UR1) scheme for the Session Initiation Protocol (SIP) multimedia communications protocol), a TEL UR1 (resources identified by telephone numbers), other user@domain types of UR1, etc.) and a varying part (in the form of a timestamp).

At S312, a Direct Authentication and Key establishment process can be carried out between UE 301 and UE 301. The Direct Authentication and Key establishment process may be different depending on the authentication scheme employed in different examples. As a result of the Direct Authentication and Key establishment process, UE 301 and UE 302 have authenticated each other, and a root key $K_D$ for the direct communications between UE 301 and UE 302 can be obtained.

At S313, UE 302 transmits a direct Security Mode Command message to UE 301. The message can include security-establishment-related information and possibly other parameters. The security-establishment-related information can include a UE_2 ID, a Nonce_2, a signature covering the UE_2 ID and the Nonce_2, and the root key $K_D$ in an encrypted form. Similarly, in some examples, user related information of UE 302 can be carried in the message instead of the UE_2 1D.

At S314, UE 301 can transmit a Direct Security Mode Complete message to inform UE 302 that a security association has been established at UE 301. The process 300 can terminate thereafter.

During the process 300, in some embodiments, the establishment of security can depend on a public-key mechanism known as identity-based encryption. Each UE is presumed to be pre-configured with a "master" public key belonging to a key management server (KMS), and aware of an algorithm for generating the public key for any peer UE based on the master public key and the identity (ID) of the peer UE. In the process 300 for establishing a connection, the Direct Communication Request message includes the identity of UE_1 and a first signature. The first signature can be derived from a private key of UE_1. Upon receiving the message, UE_2 uses the master public key and the identity of UE_1 to derive the public key of UE_1, allowing it to confirm the authenticity of the first signature. After this step, UE_2 has confirmed the identity of UE_1. Subsequently, UE_2 transmits a Direct Security Mode Command, which includes the identity of UE_2 and a second signature. The second signature is derived from a private key of UE_2. Upon receiving the message, UE_1 uses the master public key and the identity of UE_2 to derive the public key of UE_2, allowing it to confirm the authenticity of the second signature. After this step, UE_1 has confirmed the identity of UE_2. In some embodiments, the public-key mechanism used for these procedures is the "Elliptic Curve-based Certificateless Signatures for Identity-based Encryption" (ECCSI) mechanism defined in IETF RFC 6507. In principle, any public-key mechanism can be used, so long as it provides a means to generate individual public keys from the master public key.

At substantially the same time as the authentication procedure, UE_1 and UE_2 can exchange information to generate a shared root key $K_D$, known only to UE_1 and UE_2. A session key $K_{D\text{-}sess}$ may subsequently be derived from $K_D$. To facilitate the generation of $K_{D\text{-}sess}$, the Direct Communication Request message in S311 contains a nonce (i.e., an arbitrary number generated by UE_1 for one-time use) labelled as Nonce_1, which is used as an input for key derivation. Nonce_1 is not a secret and may be exchanged in the clear between the two UEs. (The generation of $K_D$ may use any of a variety of key generation algorithms, based on information exchanged between UE_1 and UE_2; the details of the key generation algorithm are outside the scope of this disclosure. Additional steps of the key generation may occur as part of S312.) Upon receiving Nonce_1 in the Direct Communication Request message (S311), and after determining $K_D$, UE_2 generates a second nonce, labelled as Nonce_2, and derives $K_{D\text{-}sess}$ from $K_D$ using Nonce_1 and Nonce_2 as inputs. UE_2 then sends Nonce_2 to UE_1 in the Direct Security Mode Command message (S313), along with explicitly signalling the value of $K_D$ in encrypted form. In some embodiments, the method used to encrypt $K_D$ for this message is Sakai-Kasahara Key Encryption (SAKKE), as defined in IETF RFC 6508. In principle other mechanisms may be used. UE_1 also derives $K_{D\text{-}sess}$ from $K_D$ using Nonce_1 and Nonce_2 as inputs. Accordingly, UE_1 and UE_2 have a shared session key known only to them. After this step, $K_{D\text{-}sess}$ can be used to secure communications between UE_1 and UE_2 using any agreed-upon security algorithms.

Note that, for the generation of $K_{D\text{-}sess}$ to proceed correctly, Nonce_1 and Nonce_2 must be reliably and accurately exchanged between UE_1 and UE_2. To achieve this, the signatures applied to the Direct Communication Request and Direct Security Mode Command messages can also cover the nonces, as well as the corresponding UE identities. The generation of the signature from these inputs, and confirmation of the signature by the recipient can depend on the specific authentication method employed.

In some embodiments, the security-establishment-related information at S311 can further include other parameters, such as UE_1 security capabilities; most significant bits of the $K_{D\text{-}sess}$ ID; optionally, a $K_D$ ID if the UE_1 has an existing $K_D$; necessary information to establish a $K_D$ from a relevant long term key(s) held on the UE; and information of a long term ID needed by the UE_2 in order to retrieve the right long term Key.

In some embodiments, the security-establishment-related information at S313 can further include other parameters, such as most significant bits of $K_D$ ID if a fresh $K_D$ is generated; Nonce_2 to allow a session key to be calculated; parameters of chosen algorithms to indicate which security algorithms the UEs will use to protect the data; and the least significant bits of $K_{D\text{-}sess}$ ID which can be used by UE 301 to locally identify a security context.

Figure 4:
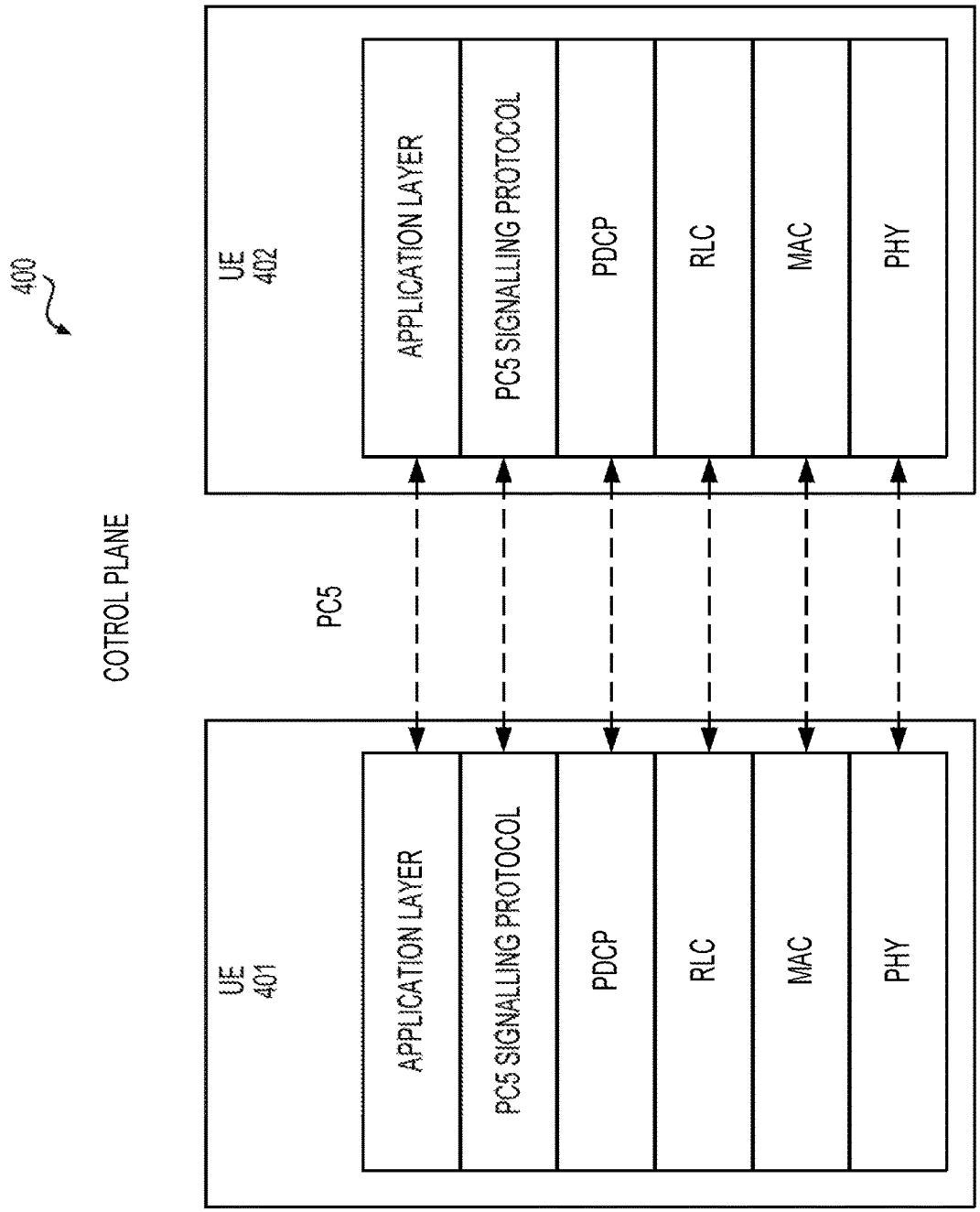
FIG. 4 shows an example of control-plane protocol stacks 400 for direct communications between two peer UEs, UE 401 and UE 402.

FIG. 4 shows an example of control-plane protocol stacks 400 for direct communications between two peer UEs, UE 401 and UE 402. As shown, UE 401 and 402 communicate through a PC5 reference point. Each protocol stack of UE 401 or UE 402 can include a physical (PHY) layer, a medium access control (MAC) layer, a radio link control (RLC) layer, a packet data convergence protocol (PDCP) layer, a PC5 signalling protocol layer, and an application layer.

During a connection setup and security establishment process, the messages (such as a Direct Communication Request message, a Direct Security Mode Command message, a Direct Security Mode Complete message, a Direct Communication Accept, and the like) can be exchanged at the PC5 signalling protocol layers at UE 401 and UE 402. The PC5 signalling protocol layers can receive content from the upper application layers to form the messages. In some embodiments, other signalling protocol layers may be used to exchange messages with similar functionality. Security contexts for a connection between UE 401 and UE 402 can be provided from the application layers to the PDCP layers.

The foregoing description covers the establishment of peer-to-peer security in the LTE and NR sidelink environments. The introduction of relaying in 3GPP Rel-17 creates a scenario in which UE_1 and UE_2 do not communicate directly, but rather via a third "relay" UE, UE_R. In this scenario, UE_1 and UE_2 may be referred to as remote UEs. Traffic from UE_1 may be delivered by the relay UE_R to UE_2, and vice versa. The relay UE_R may not have access to the traffic in the clear. It may be necessary to have end-to-end security between UE_1 and UE_2.

Figure 5A:
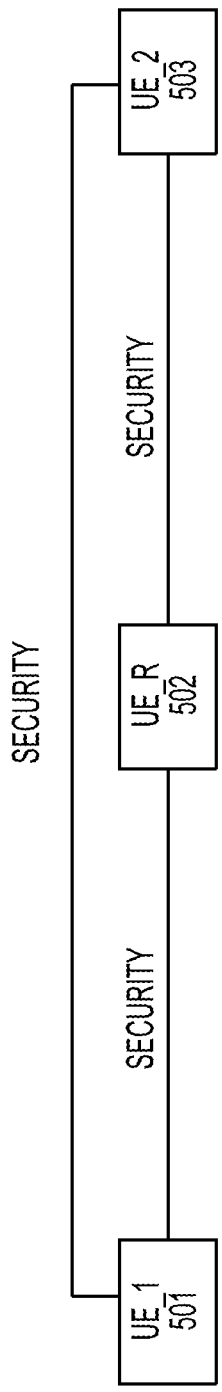
FIG. 5A shows an example where UE_1 501 and UE_2 503 communicate via a relay UE, UE_R 502.

FIG. 5A shows an example where UE_1 501 and UE_2 503 communicate via a relay UE, UE_R 502. For a connection between two remote UEs UE_1 501 and UE_2 503 via a relay UE UE_R 502 to be secured, security can be established on three links: between UE_1 501 and UE_R 502, between UE_R 502 and UE_2 503, and between UE_1 501 and UE_2 503. The first two "direct" links can rely on sidelink procedures for security establishment, but some extra effort is required to establish security for the third "indirect" link between UE_1 501 and UE_2 503.

To determine a session key for use between UE_1 501 and UE_2 503, the UE that initiates the connection (e.g., UE_1 501) can provide its own ID and a nonce value. The UE that terminates the connection (e.g., UE_2 503) can confirm the legitimacy of the initiating message (e.g., a Direct Communication Request message) based on the source's ID and the public key of the source, and generate a session key based on a generated root key, the source's ID, and the nonce. However, the initiating message is not sent directly from UE_1 501 to UE_2 503, but instead routed through UE_R 502. In a connection establishment scheme disclosed herein, the initiating message serves both to establish the connection between UE_1 501 and UE_R 502 and to establish the connection between UE_1 501 and UE_2 503. UE_R 502 receives the initiating message from UE_1 501 and triggers its own procedure to establish security with UE_1 501, while also forwarding the initiating message to UE_2 503.

The contents of the initiating message allow both UE_R 502 and UE_2 503 to verify that the message comes legitimately from UE_1 501 and has not been tampered with. The initiating message may, for example, be signed with a private key of UE_1 501 and can be confirmed using a public key of UE_1 501. Such a public key can be calculated by UE_R 502 or UE_2 503 based on information provided in the initiating message, e.g., an identity of UE_1, along with a previously known public key of a key server.

Further, the inclusion of a nonce in the initiating message allows UE_R 502 to generate a session key for use with UE_1 501, based on the nonce as well as other key establishment information. When the initiating message is forwarded from UE_R 502 to UE_2 503, if the same nonce is provided, UE_2 503 will generate a session key using the same nonce as UE_R 502. This may be acceptable if the other key establishment information is sufficient to guarantee key separation (e.g., a dependency on the identity of the receiver, causing UE_R 502 to generate different keys from UE_2 503). On the other hand, it may be preferable to include a separate nonce for UE_2 503, in which case the initiating message can be expanded to include two nonces: a first nonce for direct use (between UE_1 501 and UE_R 503), and a second nonce for end-to-end use (between UE_1 501 and UE_2 503).

Figure 5B:
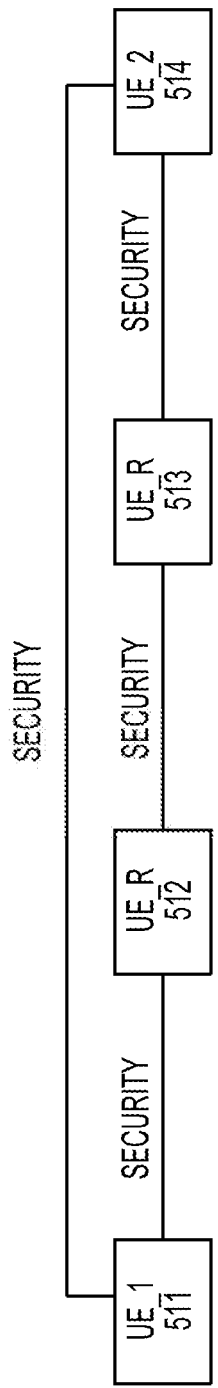
FIG. 5B shows an example where a connection goes from UE_1 511 to UE_R1 512 to UE_R2 513 to UE_2 514.

It is noted that in an environment of a mesh network or multi-hop relays, there may be more than one relay UEs between UE_1 and UE_2. However, this does not result in a need for additional security associations. FIG. 5B shows an example where a connection goes from UE_1 511 to UE_R1 512 to UE_R2 513 to UE_2 514. There may be no requirement for a security association between UE_1 511 and UE_R2 513, nor between UE_2 514 and UE_R1 512. This is because there is no traffic between these pairs of endpoints. Security can be established on a hop-by-hop basis. In such a way, communications between each UE and its "neighbors" in the communication chain can be secured. Security can also be established on an end-to-end basis. As a result, communications between the two endpoint UEs 511 and 514 can be secured.

On the other hand, in an environment with multiple relays, each relay can establish a security association with the next relay. In the FIG. 5B example described above, UE_R1 512 and UE_R2 513 can communicate securely. (Although the relay UEs would not be expected to exchange user-plane traffic as part of the relaying connection, they can exchange signalling to manage the connection between them. This signalling can be secured according to normal security principles.) Thus, for example, when forwarding the initiating message (such as a Direct Communication Request) to UE_R2 513, UE_R1 512 may need to replace the first "direct" nonce (which was provided by UE_1 511) with a new value for use between UE_R1 512 and UE_R2 513.

Figure 6:
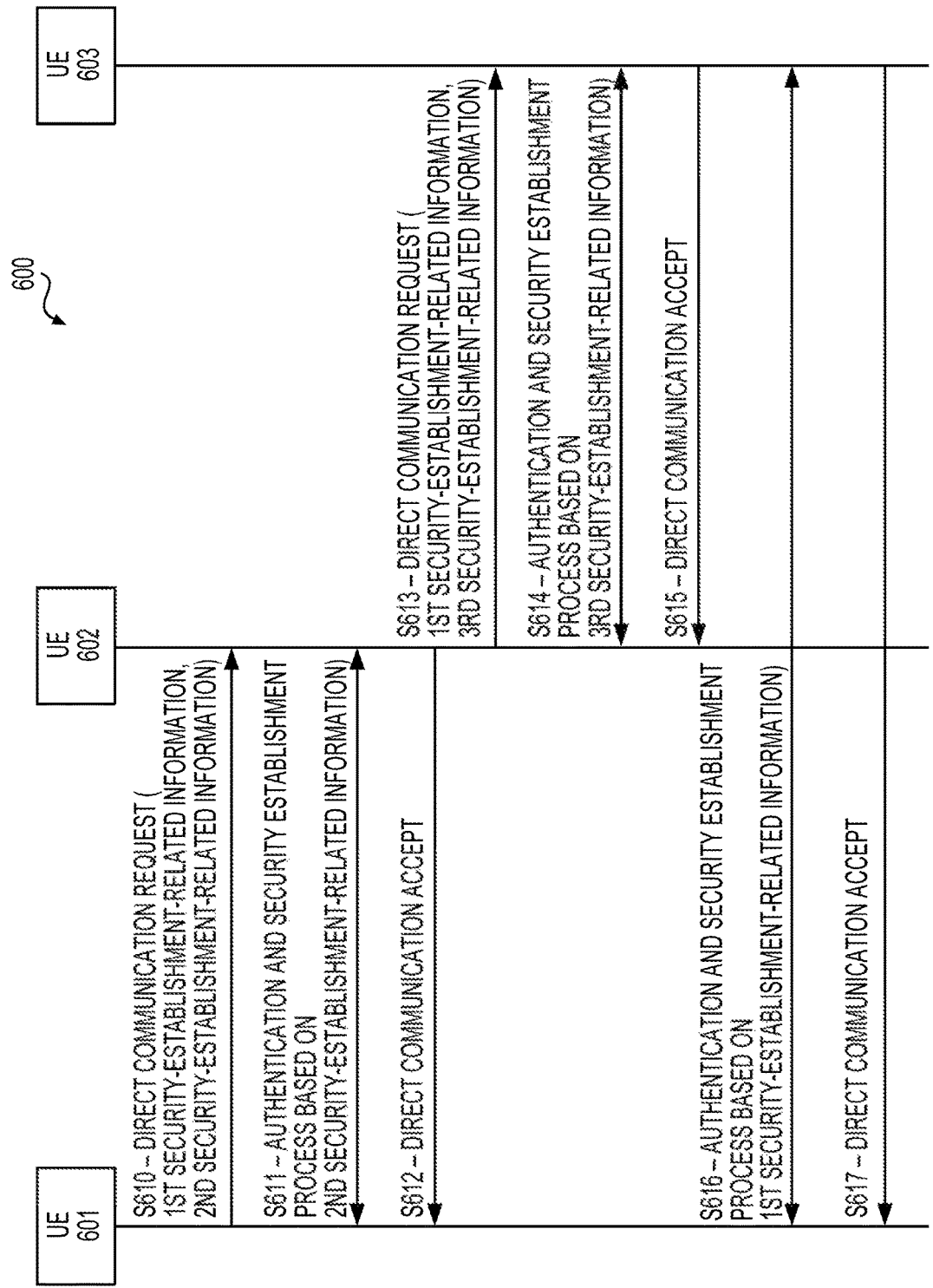
FIG. 6 shows an example of a connection setup process 600 between two peer UEs 601 and 603 communicating via a relay UE 602 according to embodiments of the disclosure.

FIG. 6 shows an example of a connection setup process 600 between two peer UEs 601 and 603 communicating via a relay UE 602 according to embodiments of the disclosure. During the process 600, secure connections can be established between UE 601 and UE 602, between UE 601 and UE 603, and between UE 601 and UE 603. UE 601 can be referred to as an initiating UE, while UE 603 can be referred to a target UE. Each UE 601-603 can be a vehicle, a mobile phone, a portable computer, or the like. Each UE 601-603 is capable of communicating with one or more neighbor UEs via a direct interface, such as an NR-based sidelink or an LTE-based (Evolved Universal Terrestrial Radio Access (E-UTRA) based) sidelink.

At S610, UE 601 can transmit a Direct Communication Request message to initiate the connection setup process 600. In an example, UE 601 can know which UE is the target UE 603 (e.g., a layer 2 ID or an application ID of UE 603) and send the Direct Communication Request message addressed to the target UE. For example, UE 603 may periodically broadcast an announcement message in the mesh network to declare the services UE 603 can provide. UE 601 may receive such an announcement message and accordingly want to request a service from UE 603. For another example, UE 601 may send a query message asking for a specific service. UE 603 may reply to the query message with a confirmation that UE 603 can provide the requested service. The reply message can indicate an ID of UE 603.

In an example, UEs 601-603 can be part of a wireless mesh network. Each UE can maintain a routing table locally based on a routing protocol. Based on the routing table, UE 601 can select a neighbor UE to be the relay UE 602 in order to reach the target UE 603. Alternatively or in addition, UE 601 may apply other criteria to select relay UE 602, such as signal strength, geographical proximity, an indication from relay UE 602 that it can serve as a relay UE between UE 601 and UE 603, and so on.

In an example, UE 601 may not know the target UE in advance. UE 601 may include information in the Direct Communication Request message to indicate a desired service and broadcast the Direct Communication Request message. A neighbor UE of UE 601 (such as UE 602) may receive the broadcast message and forward the message to one or more surrounding UEs. UE 603, when receiving the Direct Communication Request message, can determine to reply to UE 601 to confirm that UE 603 would be the target UE. For example, UE 603 can determine that it can support the desired service, and UE 603 may indicate such support in a reply to UE 601.

In an embodiment, the Direct Communication Request message of S610 can include two separate sets of security-establishment-related information: 1st security-establishment-related information and 2nd security-establishment-related information. The 1st security-establishment-related information is to be used for security establishment between the initiating UE 601 and the relay UE 602. The 2nd security-establishment-related information is to be used for security establishment between the initiating UE 601 and the target UE 603. The 1 st security-establishment-related information and 2nd security-establishment-related information can be similar to that in the FIG. 2 and FIG. 3 examples.

At S611, UE 602 initiates an authentication and security establishment process in response to receiving the Direct Communication Request message of S610. The authentication and security establishment process can be based on the 2nd security-establishment-related information of S610. For example, the authentication and security establishment process can include an authentication and key establishment process to perform mutual authentication and derive a root key for UEs 601 and 602. The authentication and security establishment process can further include a security mode control process to establish a security association for a session between UEs 601 and 602. For example, the authentication and security establishment process can include steps similar to S212-S216 in the FIG. 2 example, or steps similar to S312-S314 in the FIG. 3 example.

At S612, UE 602 can transmit a direct communication accept message to S601 to complete the connection setup between UE 601 and UE 602.

At S613, UE 602 can transmit a Direct Communication Request message to UE 603. The Direct Communication Request message of S613 can include two separate sets of security-establishment-related information: 1st security-establishment-related information and 3rd security-establishment-related information. The 3rd security-establishment-related information is to be used for security establishment between UE 602 and UE 603. The 3rd security-establishment-related information can be similar to that in the FIG. 2 and FIG. 3 examples.

For example, after UE 602 has authenticated UE 601 based on the 2nd security-establishment-related information of S610, UE 602 can replace the 2nd security-establishment-related information of S610 with the 3rd security-establishment-related information to form the Direct Communication Request message of S613. Although S613 is shown to follow S612 in the FIG. 6 example, S613 can be performed once UE 602 has completed the authentication with UE 601 in other examples.

At S614, UE 603 initiates an authentication and security establishment process in response to receiving the Direct Communication Request message of S613. For example, based on the Direct Communication Request message of S613, UE 603 can determine that UE 603 is the target UE for the initiating UE 601. Accordingly, UE 603 can end the forwarding of the 1st security-establishment-related information, and start to first establish a secure connection between UE 603 and UE 602 and then establish a secure connection between UE 603 and UE 601.

In some embodiments, this authentication and security establishment process of S614 can be similar to the authentication and security establishment process of S611 but based on the 3rd security-establishment-related information of S613.

At S615, UE 603 can transmit a direct communication accept message to S602 to complete the connection setup between UE 602 and UE 603.

At S616, UE 603 initiates an authentication and security establishment process between UE 603 and UE 601 based on the 1st security-establishment-related information.

At S617, UE 603 can transmit a direct communication accept message to S601 to complete the connection setup between UE 601 and UE 603. The process 600 can terminate thereafter.

In an embodiment, different from the FIG. 6 example, the Direct Communication Request message transmitted at S610 can only include the 1st security-establishment-related information. Accordingly, the authentication and security establishment process at S611 can also be based on the 1st security-establishment-related information (that is the same as that used in S616.

Figure 7:
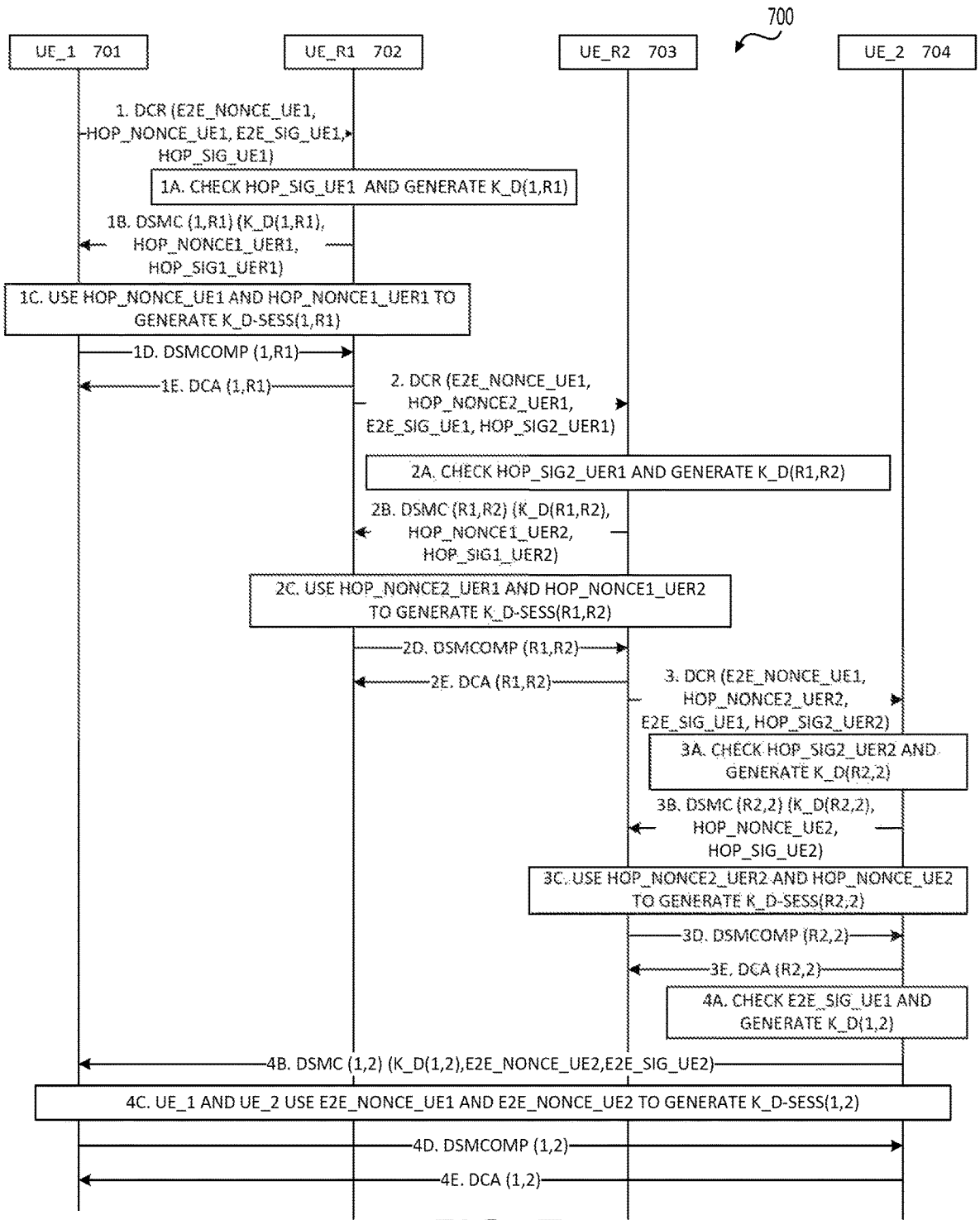
FIG. 7 shows a message flow 700 for connection setup and security establishment in a setting with two relay UEs according to some embodiments of the disclosure.

FIG. 7 shows a message flow 700 for connection setup and security establishment in a setting with two relay UEs according to some embodiments of the disclosure. In this flow 700, a first remote UE UE_1 701 wishes to establish communication with a second remote UE UE_2 704, and the communication is mediated by two relay UEs UE_R1 702 and UE_R2 703. The connection setup signalling is shown using the terminology of the PC5 signalling (PC5-S) protocol from 5G systems, in which the connection setup is initiated by a Direct Communication Request (DCR) message and concluded by a Direct Communication Accept (DCA) message, and security is established with a Direct Security Mode Command (DSMC) message followed by a Direct Security Mode Complete (DSMComp) message.

Steps 1 through 1e of FIG. 7 establish a connection with secure communication between the first remote UE UE_1 701 and the first relay UE UE_R1 702.

In step 1 of FIG. 7, UE_1 701 sends a first DCR message soliciting communication with UE_2 702. The first DCR message may be sent after a discovery procedure has taken place, meaning that UE_1 701 already knows that it is communicating via relays with UE_2 702. Alternatively, the first DCR message may be sent as a step in a discovery procedure, meaning that UE_1 701 solicits communication with UE_2 702 but does not yet know if UE_2 702 is accessible (directly or via one or more relays). The first DCR message contains at least a first nonce (E2E_Nonce_UE1) and a first signature of UE_1 701 (E2E_Sig_UE1), which will be used for end-to-end communication with UE_2 704. The first DCR message may also contain a second nonce (Hop_Nonce_UE1) that will be used for hop-by-hop communication with UE_R1 702 in a subsequent step. The signature E2E_Sig_UE1 may be generated by any of a variety of methods, such as by signing the message content with a private key of UE_1 701 according to a public-key cryptography scheme. The first DCR message may also include either a temporary or permanent identity of UE_1 701 (not shown in FIG. 7).

If the second nonce Hop_Nonce_UE1 is included in the first DCR message, the signature E2E_Sig_UE1 may be generated over a portion of the first DCR message that excludes Hop_Nonce_UE1. (This is because Hop_Nonce_UE1, if included, will be replaced with a different value in subsequent steps.) Accordingly, E2E_Sig_UE1 may not be usable to confirm that Hop_Nonce_UE1 has not been tampered with in transmission, and it may be necessary for UE_1 701 to include in the first DCR message a second signature of UE_1 701 (Hop_Sig_UE1). The second signature of UE_1 701 may be computed over a portion of the message that includes Hop_Nonce_UE1.

In step 1a of FIG. 7, UE_R1 702 receives the first DCR message and uses a cryptographic operation to confirm the validity of Hop_Sig_UE1, if provided. (If Hop_Sig_UE1 is not provided, UE_R1 702 may confirm the validity of E2E_Sig_UE1 to verify the identity of the originating UE, although if E2E_Sig_UE1 does not cover Hop_Nonce_UE1. This process will not confirm that Hop_Nonce_UE1 has not been modified or corrupted.)

A typical procedure for this confirmation step can be performed as follows. A sender ("Alice") provides a recipient ("Bob") with an ID of the sender (for instance, "alice@example.com") in a message signed with a private key of the sender, and the recipient computes the sender's public key based on the ID and additional information such as a key server configuration. The computation of the sender's public key may rely on an identity-based mechanism, in which an identity of the sender and a public key of a key server are sufficient to derive a public key of the sender. Knowing the sender's public key allows the recipient to confirm that the signature on the message belongs to the sender, and thus that the message legitimately originates from the claimed source and has not been tampered with or corrupted in transmission. In the context of FIG. 7, this means that in step 1a, UE_R1 702 can confirm by checking Hop_Sig_UE1 or E2E_Sig_UE1 that the first DCR message legitimately comes from UE_1 701.

Also in step 1a of FIG. 7, UE_R1 701 may generate a root key $K_D(1,R1)$ to be used for secure communication between UE_1 701 and UE_R1 702. The derivation of $K_D(1,R1)$ may depend at least in part on information from the first DCR message, and may use any of a variety of techniques for key generation. In some embodiments, the generation of $K_D(1,R1)$ may also depend on information not known to UE_1 701, because $K_D(1,R1)$ will be provided to UE_1 701 in a subsequent step and does not need to be generated by UE_1.

In step 1b of FIG. 7, UE_R1 702 sends a first Direct Security Mode Command (DSMC) message to UE_1 701. The first DSMC command may contain the root key $K_D(1, R1)$ in an encrypted format. Various techniques may be used to secure the distribution of $K_D(1,R1)$. The first DSMC command may contain a third nonce (Hop_Nonce_UER1) generated by UE_R1 702 and/or a first signature of UE_R1 702 (Hop_Sig1_UER1).

In step 1c of FIG. 7, UE_1 701 and UE_R1 702 independently generate a first session key $K_{D\text{-}sess}(1,R1)$, which may be used to secure subsequent communication between UE_1 701 and UE_R1 702. The first session key may be generated from one or more inputs including the root key $K_D(1,R1)$, the second nonce Hop_Nonce_UE1, or the third nonce Hop_Nonce1_UER1. The establishment of the first session key means that UE_1 701 and UE_R1 702 can communicate securely.

In step 1d of FIG. 7, UE_1 701 sends a first Direct Security Mode Complete (DSMComp) message to UE_R1 702. The first DSMComp message may be security-protected (ciphered and/or signed) using one or more keys derived from $K_{D\text{-}sess}(1,R1)$.

In step 1e of FIG. 7, UE_R1 702 sends a first Direct Communication Accept (DCA) message to UE_1 701. The first DCA message may be security-protected (ciphered and/or signed) using one or more keys derived from $K_{D\text{-}sess}(1,R1)$.

Steps 2 through 2e of FIG. 7 establish a connection with secure communication between the first relay UE UE_R1 and the second relay UE UE_R2. The steps are similar to steps 1 through 1e, but some of the parameters provided by UE_1 in steps 1 through 1e are replaced with new parameters provided by UE_R1 in steps 2 through 2e.

In step 2 of FIG. 7, UE_R1 702 delivers a second DCR message to UE_R2 703. The second DCR message may be considered as a forwarded copy of the first DCR message, with some parameters modified as described herein. The second DCR message may contain the first nonce (E2E_Nonce_UE1) and the first signature of UE_1 (E2E_Sig_UE1), which are also in the first DCR message. However, the second nonce (Hop_Nonce_UE1), if it was originally included, may be replaced with a fourth nonce (Hop_Nonce2_UER1) and the second signature of UE_1 (Hop_Sig_UE1) may be replaced with a second signature of UE_R1 702 (Hop_Sig2_UER1). The second signature of UE_R1 702 may be computed over a portion of the message that includes Hop_Nonce2_UER1.

In step 2a of FIG. 7, UE_R2 703 checks Hop_Sig2_UER1 to confirm the identity of UE_R1 and the integrity of the second DCR message. Also in step 2a of FIG. 7, UE_R2 703 generates a second root key $K_D(R1,R2)$ for communication between UE_R1 702 and UE_R2 703. Similar to step 1a of FIG. 7, these procedures may use any of a variety of cryptographic techniques.

In step 2b of FIG. 7, UE_R2 703 sends a second DSMC message to UE_R1 702. The second DSMC message may contain the second root key (in encrypted form), a fifth nonce Hop_Nonce1_UER2, and/or a first signature of UE_R2 703. Hop_Sig1_UER2.

In step 2c of FIG. 7, UE_R1 702 and UE_R2 703 use the fourth and fifth nonces (Hop_Nonce2_UER1 and Hop_Nonce1_UER2) to generate a second session key $K_{D\text{-}sess}$ (R1,R2).

In step 2d of FIG. 7, UE_R1 702 sends a second DSM-Comp message to UE_R2 703. The second DSMComp message may be security-protected using one or more keys derived from $K_{D\text{-}sess}$ (R1,R2).

In step 2e of FIG. 7, UE_R2 703 sends a second DCA message to UE_R1 702. The second DCA message may be security-protected using one or more keys derived from $K_{D\text{-}sess}$ (R1,R2).

Steps 3 through 3e of FIG. 7 establish a connection with secure communication between UE_R2 703 and UE_2 704, using substantially the same procedures as the corresponding operations in steps 2 through 2e of FIG. 7.

In step 3 of FIG. 7, UE_R2 703 sends a third DCR message to UE_2 704. The third DCR message may be considered as a forwarded copy of the first DCR message, with some parameters modified as described herein. The second nonce Hop_Nonce_UE1 in the first DCR message may be replaced with a sixth nonce Hop_Nonce2_UER2, and the second signature of UE_1 (Hop_Sig_UE1) may be replaced with a second signature of UE_R2 (Hop_Sig2_UER2). The second signature of UE_R2 703 may be computed over a portion of the message that includes Hop_Nonce2_UER2.

In step 3a of FIG. 7, UE_2 704 checks Hop_Sig2_UER2 to confirm the identity of UE_R2 703 and the integrity of the third DCR message, and generates a third root key $K_D(R2,2)$ for communication between UE_R2 703 and UE_2 704.

In step 3b of FIG. 7, UE_2 704 sends a third DSMC message to UE_R2 703, containing some or all of the third root key (in encrypted form), a seventh nonce Hop_Nonce_UE2, or a first signature of UE_2 704 (Hop_Sig_UE2).

In step 3c of FIG. 7, UE_R2 703 and UE_2 704 separately generate a third session key $K_{D\text{-}sess}$ (R2,2), using Hop_Nonce2_UER2 and Hop_Nonce_UE2.

In step 3d of FIG. 7, UE_R2 703 sends a third DSMComp message to UE_2 704.

In step 3e of FIG. 7, UE_2 704 sends a third DCA message to UE_R2 703.

Steps 4a through 4e of FIG. 7 establish a connection with secure communication between UE_1 701 and UE_2 704. The procedures are similar to steps 2a through 2e or steps 3a through 3e of FIG. 7. It is noted that no delivery of an additional DCR message is needed, because the DCR message was already delivered to UE_2 704 in step 3 above.

In step 4a of FIG. 7, UE_2 704 checks E2E_Sig_UE1 (the first signature of UE_1) to confirm the identity of UE_1 701 and the integrity of those portions of the third DCR message that are covered by E2E_Sig_UE1. It is noted that E2E_Sig_UE1 is carried unchanged through the first, second, and third DCR messages, so any fields covered by E2E_Sig_UE1 must also be carried unchanged through the first, second, and third DCR messages. As an example, E2E_Sig_UE1 may cover fields of the third DCR message indicating an identity of UE_1 and the first nonce E2E_Nonce_UE1. Also in step 4a of FIG. 7, UE_2 704 generates a fourth root key $K_D(1,2)$.

In step 4b of FIG. 7, UE_2 704 sends a fourth DSMC message to UE_1 701. Transport for the fourth DSMC message may be provided by the intervening relay UEs UE_R2 703 and UE_R1 702. The fourth DSMC message may be transmitted on a signalling radio bearer that supports routing of messages by the relay UEs. The fourth DSMC message may contain the fourth root key (in encrypted form), an eighth nonce E2E_Nonce_UE2, and/or a second signature of UE_2 704 (E2E_Sig_UE2).

In step 4c of FIG. 7, UE_1 701 and UE_2 704 separately generate a fourth session key $K_{D\text{-}sess}$ (1,2) for communication between UE_1 701 and UE_2 704, using E2E_Nonce_UE1 and E2E_Nonce_UE2. It is noted that although UE_R1 702 and UE_R2 703 participated in the transport of the fourth DSMC message from UE_2 704 to UE_1 701, they do not have access to the value of $K_D(1,2)$, and therefore UE_R1 702 and UE_R2 703 cannot duplicate the derivation of $K_D(1,2)$. As a result, security between UE_1 701 and UE_2 704 is end-to-end, meaning that the intervening relay nodes do not have access to ciphered communications between UE_1 701 and UE_2 704, nor the ability to modify integrity-protected communications between UE_1 701 and UE_2 704.

In step 4d of FIG. 7, UE_1 701 sends a fourth DSMComp message to UE_2 704.

In step 4e of FIG. 7, UE_2 704 sends a fourth DCA message to UE_1 701.

After all steps of FIG. 7 are completed, secure communication is available between each pair of adjacent UEs (that is, between UE_1 701 and UE_R1 702; between UE_R1 702 and UE_R2 703; and between UE_R2 703 and UE_2 704), as well as between the remote UEs UE_1 701 and UE_2 704.

Figure 8:
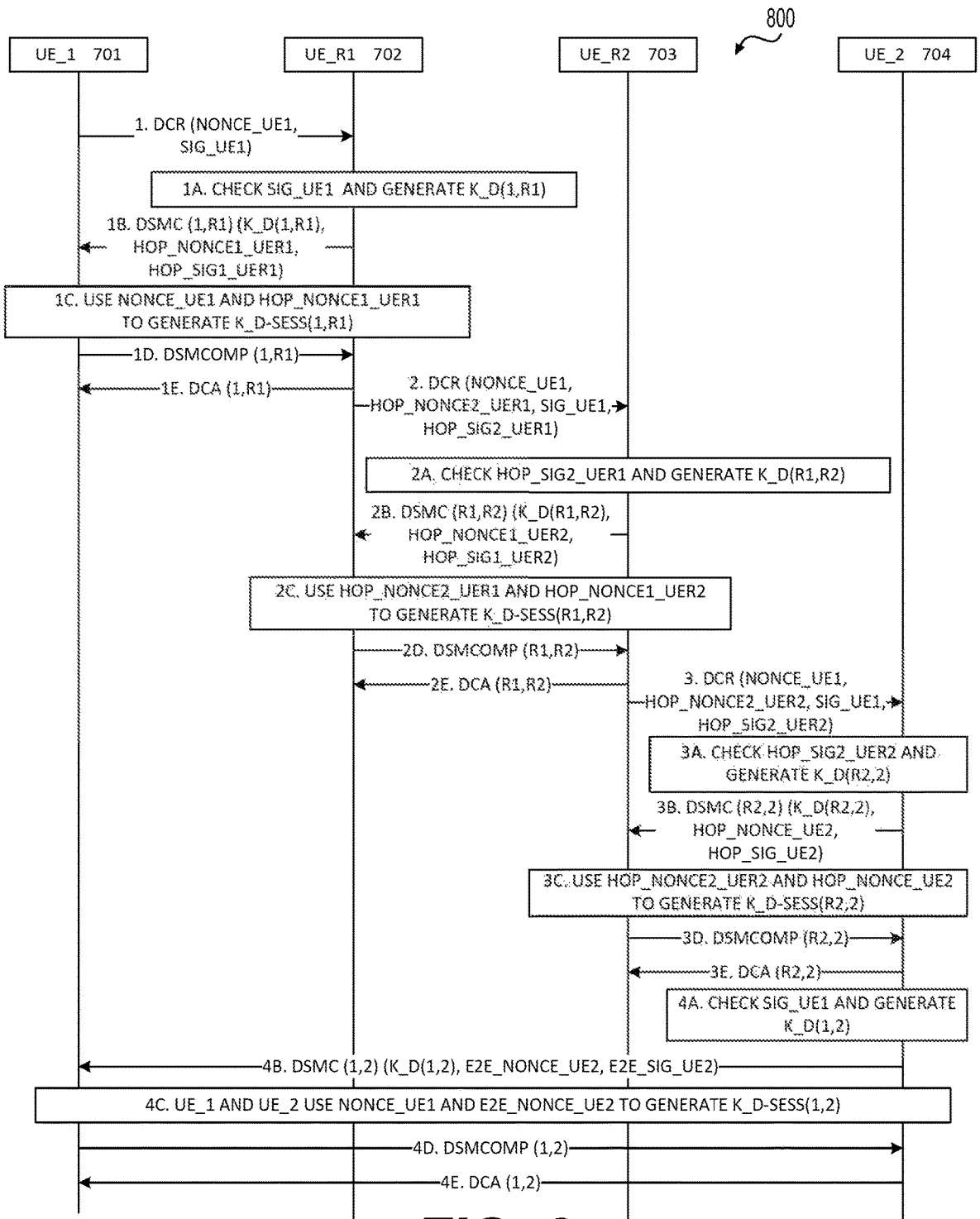
FIG. 8 shows a message flow 800 that is a variation of the message flow 700 of FIG. 7 according to an embodiment of the disclosure.

In some embodiments, it may be possible to reduce the number of separate nonces produced by the participants in the connection establishment. FIG. 8 shows message flow 800 that is a variation of the message flow of FIG. 7, in which UE_1 701 provides only a single nonce that can be used in the generation of a session key for the direct connection to the first relay UE 702 ($K_{D\text{-}sess}$ (1,R1) in the figure) and also in the generation of a session key for the end-to-end connection to the peer remote UE 704 ($K_{D\text{-}sess}$ (1,2) in FIG. 8), while maintaining key separation.

Most of the steps of FIG. 8 are identical to those of FIG. 7. However, in step 1 of FIG. 8, UE_1 701 provides only a single nonce Nonce_UE1 and a single signature Sig_UE1 (covering at least the ID of UE_1 701 and Nonce_UE1). In step 1a of FIG. 8, UE_R1 702 checks the signature Sig_UE1 to confirm the identity of UE_1 701 and the accuracy of the DCR message from step 1 of FIG. 8, and generates the root key $K_D(1,R1)$. In step 1b of FIG. 8, UE_R1 702 sends a DSMC message containing the generated $K_D(1,R1)$ (ciphered), a nonce Hop_Nonce1_UER1, and a signature Hop_Sig1_UER1 that covers at least the ID of UE_R1 and Hop_Nonce1_UER1. (The signature might reasonably be expected also to cover the ciphered key $K_D(1,R1)$, but in some embodiments this may not be necessary, e.g., if the mechanism used to protect the root key also provides a signature.) In step 1c of FIG. 8, UE_1 701 and UE_R1 702 use Nonce_UE1 and Hop_Nonce1_UER1 to generate a session key $K_{D\text{-}sess}$ (1,R1). It is noted that in a subsequent step, the same nonce Nonce_UE1 will be used to generate a session key between UE_1 701 and UE_2 704; however, key separation can be maintained, because step 1*c* of FIG. 8 also depends on Hop_Nonce1_UER1, while the subsequent step to generate the end-to-end session key will depend on a different nonce provided by UE_2 704.

In step 2 of FIG. 8, UE_R1 702 forwards the DCR message with additional information, comprising at least an identity of UE_R1 702, a nonce Hop_Nonce2_UER1, and a signature Hop_Sig2_UER1; the signature covers at least the identity of UE_R1 702 and Hop_Nonce2_UER1. Steps 2*a* through 2*e* of FIG. 8 then proceed as in FIG. 7.

In step 3 of FIG. 8, UE_R2 703 forwards the DCR message with additional information, comprising at least an identity of UE_R2 703, a nonce Hop_Nonce2_UER2, and a signature Hop_Sig2_UER2; the signature covers at least the identity of UE_R2 702 and Hop_Nonce2_UER2. It is noted that the forwarded DCR messages of steps 2 and 3 contain all the original information of the DCR message from step 1, along with additional security information provided by the intervening relay UEs; each forwarded DCR might be construed as containing a remote ID (the ID of UE_1 701), a remote nonce (Nonce_UE1), a remote signature (Sig_UE1), a relay ID (the ID of the forwarding relay UE, either UE_R1 702 or UE_R2 703), a relay nonce (Hop_Nonce2_UER1 or Hop_Nonce2_UER2), and a relay signature (Hop_Sig2_UER1 or Hop_Sig2_UER2). Steps 3*a* through 3*e* of FIG. 8 then proceed as in FIG. 7.

Steps 4*a* through 4*e* of FIG. 8 proceed as in FIG. 7. The original remote nonce Nonce_UE1 is used in step 4*c* to derive the end-to-end session key $K_{D\text{-}sess}$ (1,2); as noted above, the same nonce was used in step 1*c* for generation of $K_{D\text{-}sess}$ (1,R1), but in step 4*c*, the use of E2E_Nonce_UE2 distinguishes the key derivation inputs from those used in step 1*c*.

Figure 9:
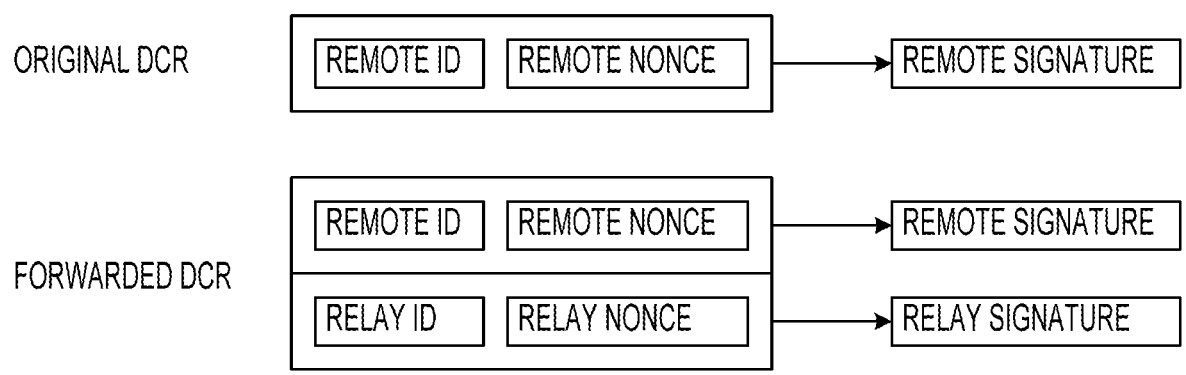
FIG. 9 shows the processes of forming the signatures during the connection setup and security establishment process 800 according to an embodiment of the disclosure.

FIG. 9 shows the processes of forming the signatures during the connection setup and security establishment process 800. The original DCR transmitted from the initiating UE 701 to the relay UE 702 can carry a remote signature. The remote signature can be formed at UE 701 based on the remote ID of UE 701 and the remote nonce generated at UE 701. The forwarded DCR transmitted from the relay UE 702 to the relay UE 703 can carry two signatures: the remote signature formed at UE 701 and a relay signature. The relay signature can be formed at UE 702 based on the relay ID of UE 702 and the relay nonce generated at UE 702. Similarly, the forwarded DCR transmitted from the relay UE 703 to the target UE 704 can carry two signatures: the remote signature formed at UE 701 and another relay signature. The relay signature can be formed at UE 703 based on the relay ID of UE 703 and the relay nonce generated at UE 703.

In the foregoing procedures, security is established at each hop as soon as the original DCR message is forwarded. This is efficient if the involved relay UEs are already aware of a route to UE_2. For instance, if UE_R1 702, UE_R2 703, and UE_2 704 are already involved in communication (e.g., as members of a mesh network) and UE_1 701 initiates communication in order to join the network. However, in some embodiments, it may be preferable to determine the route dynamically once the initial DCR is received, so that, e.g., UE_R1 702 does not establish hop-by-hop secure communication with UE_1 701 until UE_R1 702 knows that it has a route to UE_2 704. A general flow 1000 for such a procedure is shown in FIG. 10.

Figure 10:
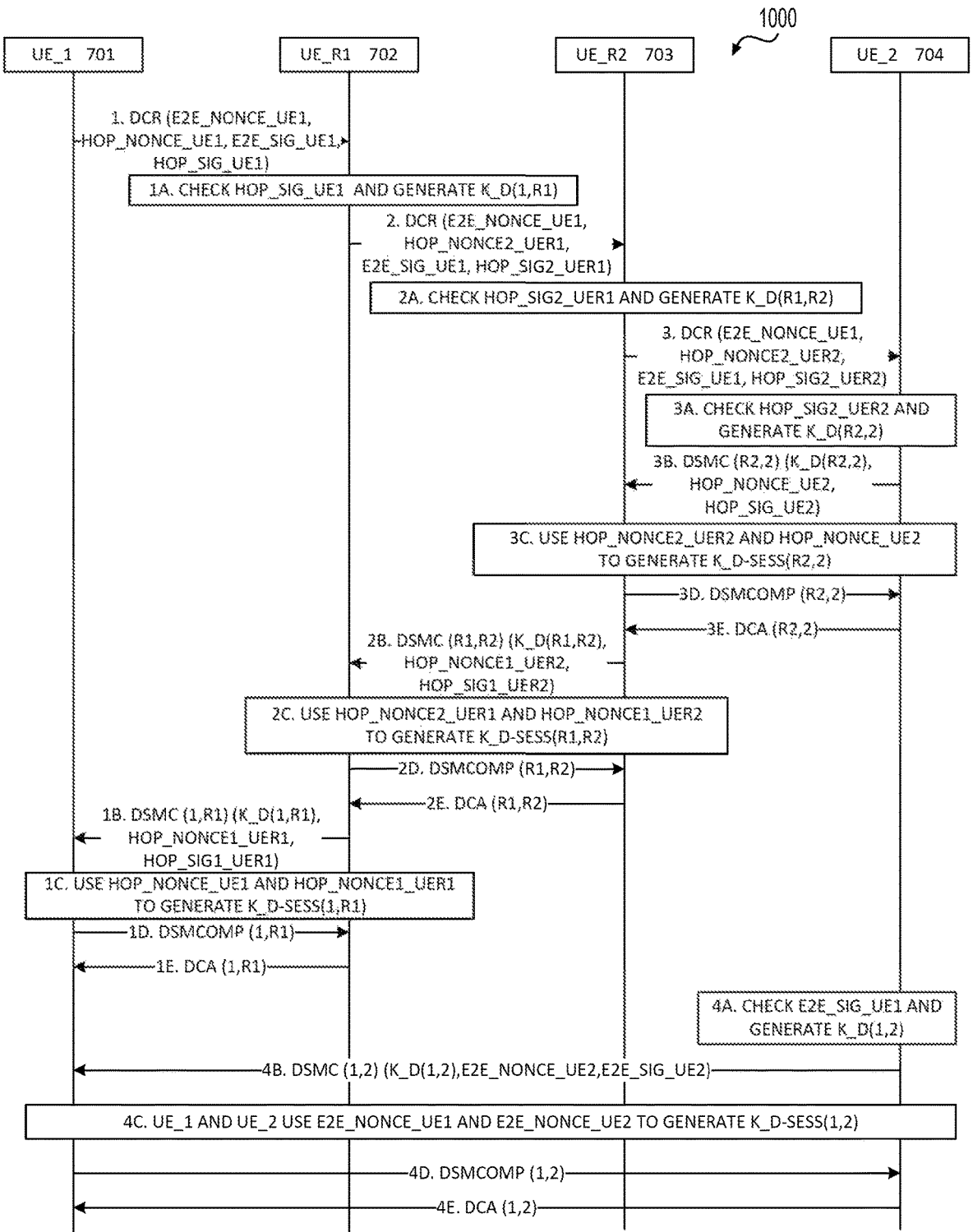
FIG. 10 shows a message flow 1000 that is a variation of the message flow 700 of FIG. 7 according to an embodiment of the disclosure.

The actual steps of FIG. 10 are identical to those of FIG. 7, but in a different order. The numbering is preserved from FIG. 7, so that steps 1-1*e* establish communication between UE_1 and UE_R1, steps 2-2*e* establish communication between UE_R1 and UE_R2, and so on. However, in contrast to FIG. 7, each relay performs forwarding of the DCR message after or immediately after confirming the signature of its predecessor—for example, step 2 (in which UE_R1 702 sends the DCR message to UE_R2 703) takes place after step 1*a* (in which UE_R1 702 confirms the identity of UE_1 701) rather than waiting until UE_R1 702 has exchanged security signalling and finished connection establishment with UE_1 701. Only after the completion of step 2*e*, when UE_R2 703 has accepted communication with UE_R1 702, does UE_R1 702 proceed to establish security and accept communication with UE_1 701 (steps 1*b*-1*e*).

It is noted that in FIG. 10, there is no explicit trigger for step 4*a* (the first step in the establishment of the end-to-end connection between UE_1 701 and UE_2 704). In fact, UE_2 704 may trigger steps 4*a* and 4*b* at any time after step 3*e*, when UE_2 704 establishes communication with UE_R2 703. This means that the DSMC message in step 4*b* may be transmitted before all intervening hop-by-hop connections have been established. For example, UE_R2 703 may receive the DSMC message of step 4*b* while it is still in the process of executing steps 2*b*-2*e*. In such a case, UE_R2 703 may delay the forwarding of the DSMC message until step 2*e* has completed.

The steps of FIG. 8 may be reordered in the corresponding manner, so that each instance of the DCR message is forwarded before completing establishment of the preceding hop-by-hop connection.

The procedure of FIG. 10, or the equivalent procedure derived from FIG. 8, may be viewed as integrating relay discovery and/or route determination into the connection establishment procedure. If such a procedure is used without prior determination of the network topology, it is beneficial to have a means to limit the forwarding of the initial DCR message. Otherwise, potential relay UEs that have no route to UE_2 may forward copies of the DCR message among themselves more or less indefinitely, causing overhead in the network. One mechanism to limit such forwarding is to associate a maximum hop count with the original DCR sent by UE_1 701. Each relay UE that receives the DCR may decrement the hop count, and forward the message to its peers only if the remaining hop count is greater than a threshold (e.g., greater than zero). This approach may have the salutary effect of bounding the latency of the path from UE_1 701 to UE_2 704 that is ultimately discovered; for example, if UE_1 701 wishes to establish communication with UE_2 704 for a service that requires low latency, it may send the initial DCR message with a correspondingly low maximum hop count, while for a latency-tolerant service, the maximum hop count may be larger. The exact method of selection of the hop count may be specified as a function of the quality of service (QoS) requirements of the desired service, or it may be left to UE_1's implementation to determine an appropriate hop count.

Figure 11:
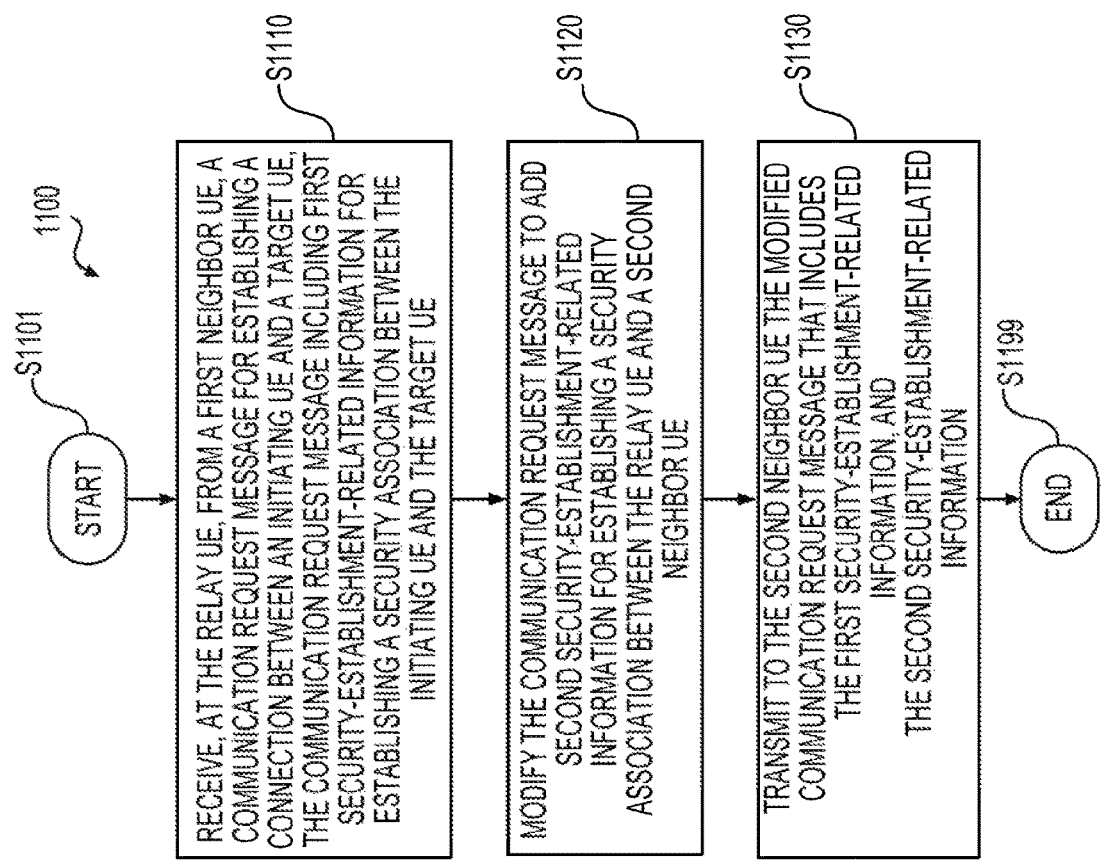
FIG. 11 shows an example of a security establishment process 1100 according to an embodiment of the disclosure.

FIG. 11 shows an example of a security establishment process 1100 according to an embodiment of the disclosure. The method can be performed at a relay UE for establishing a secure connection between an initiating UE and a target UE. The method can start from S1101 and proceed to S1110.

At S1110, a communication request message for establishing the connection between the initiating UE and the target UE can be received at the relay UE from a first neighbor UE of the relay UE. The communication request message can include first security-establishment-related information originating from the initiating UE. The first security-establishment-related information can be used for establishing a security association between the initiating UE and the target UE.

At S1120, the communication request message can be modified to add second security-establishment-related information. The second security-establishment-related information can be used for establishing a security association between the relay UE and a second neighbor UE.

At S1130, the modified communication request message can be transmitted to the second neighbor UE. The second security-establishment-related information can include (1) the first security-establishment-related information originating from the initiating UE for establishing the security association between the initiating UE and the target UE and (2) the second security-establishment-related information added by the relay UE for establishing the security association between the relay UE and the second neighbor UE. The process 1100 can proceed to S1199 and terminates at S1199.

Figure 12:
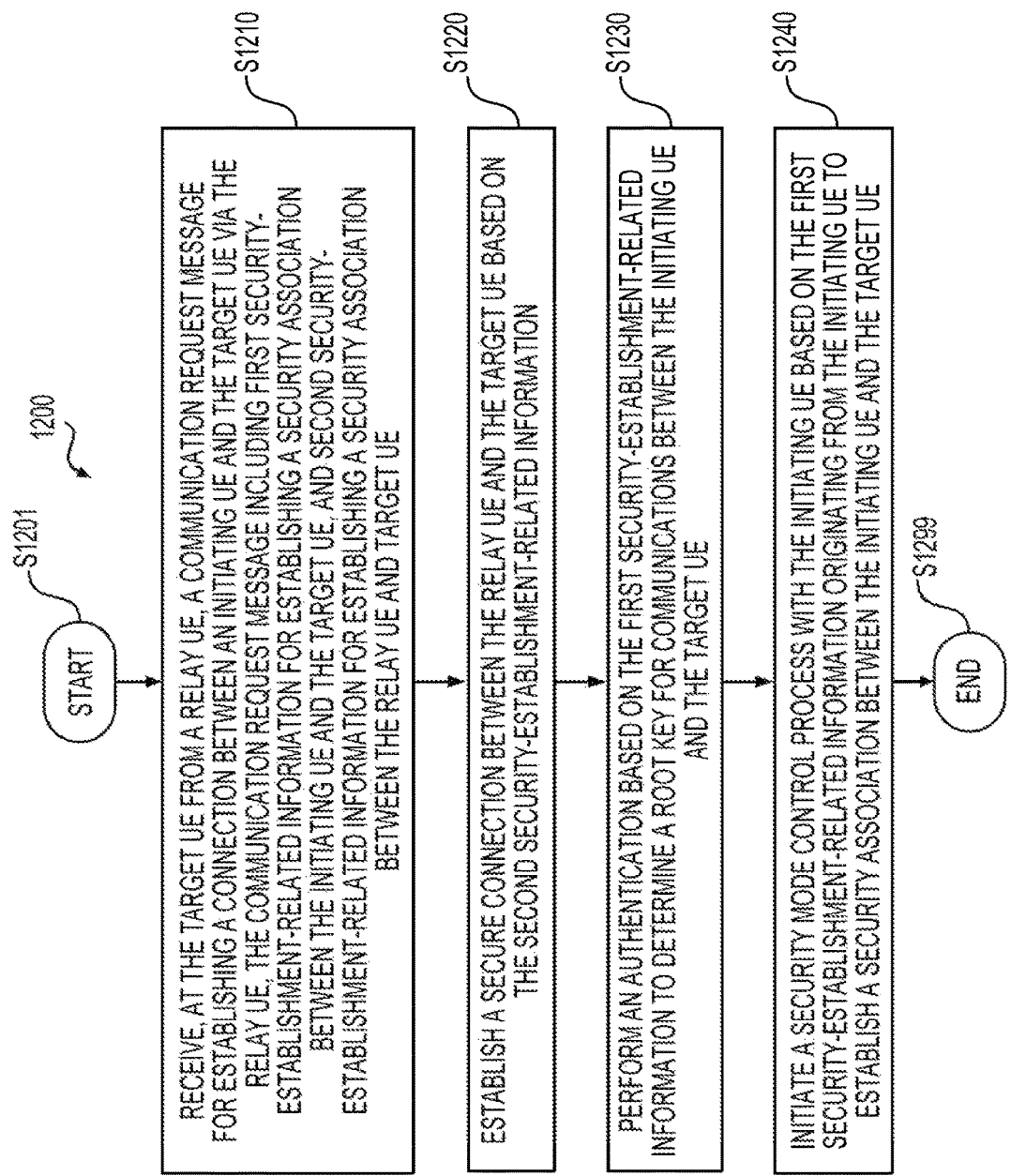
FIG. 12 shows another example of a security establishment process 1200 according to an embodiment of the disclosure.

FIG. 12 shows another example of a security establishment process 1200 according to an embodiment of the disclosure. The method can be performed at a target UE for establishing a secure connection between an initiating UE and the target UE. The method can start from S1201 and proceed to S1210.

At S1210, a communication request message for establishing a connection between an initiating UE and the target UE via the relay UE can be received at the target UE from a relay UE. For example, the communication request message including (2) first security-establishment-related information initiated from the initiating UE for establishing a security association between the initiating UE and the target UE and (2) second security-establishment-related information originating from the relay UE for establishing a security association between the relay UE and target UE.

At S1220, a secure connection can be established between the relay UE and the target UE based on the second security-establishment-related information originating from the relay UE.

At S1230, an authentication with the initiating UE can be performed based on the first security-establishment-related information originating from the initiating UE to determine a root key for communications between the initiating UE and the target UE.

At S1240, a security mode control process with the initiating UE based on the first security-establishment-related information originating from the initiating UE can be initiated to establish a security association between the initiating UE and the target UE. A security mode control command message for the initiating UE can be transmitted to the relay UE over the secure connection between the relay UE and the target UE. The process 1200 can proceed to S1299 and terminate at S1299.

Figure 13:
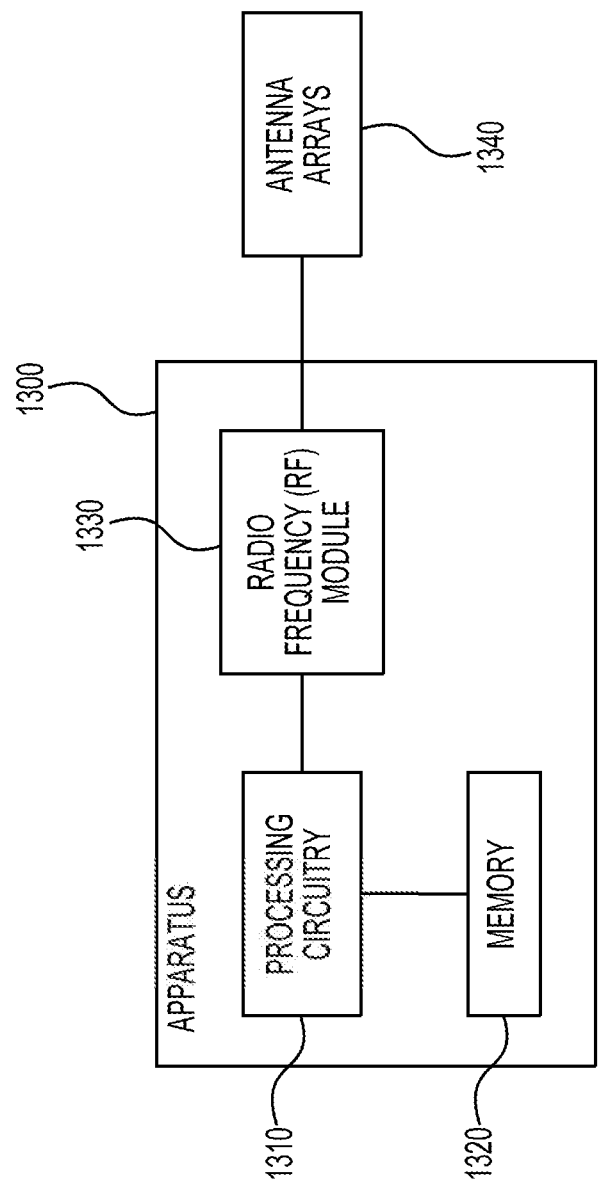
FIG. 13 shows an exemplary apparatus 1300 according to embodiments of the disclosure.

FIG. 13 shows an exemplary apparatus 1300 according to embodiments of the disclosure. The apparatus 1300 can be configured to perform various functions in accordance with one or more embodiments or examples described herein. Thus, the apparatus 1300 can provide the means for the implementation of mechanisms, techniques, processes, functions, components, and systems described herein. For example, the apparatus 1300 can be used to implement functions of UEs in various embodiments and examples described herein. The apparatus 1300 can include a general-purpose processor or specially designed circuits to implement various functions, components, or processes described herein in various embodiments. The apparatus 1300 can include processing circuitry 1310, a memory 1320, and a radio frequency (RF) module 1330.

In various examples, the processing circuitry 1310 can include circuitry configured to perform the functions and processes described herein in combination with software or without software. In various examples, the processing circuitry 1310 can be a digital signal processor (DSP), an application-specific integrated circuit (ASIC), programmable logic devices (PLDs), field-programmable gate arrays (FPGAs), digitally enhanced circuits, or comparable device or a combination thereof.

In some other examples, the processing circuitry 1310 can be a central processing unit (CPU) configured to execute program instructions to perform various functions and processes described herein. Accordingly, the memory 1320 can be configured to store program instructions. The processing circuitry 1310, when executing the program instructions, can perform the functions and processes. The memory 1320 can further store other programs or data, such as operating systems, application programs, and the like. The memory 1320 can include non-transitory storage media, such as a read-only memory (ROM), a random access memory (RAM), a flash memory, a solid-state memory, a hard disk drive, an optical disk drive, and the like.

In an embodiment, the RF module 1330 receives a processed data signal from the processing circuitry 1310 and converts the data signal to beamforming wireless signals that are then transmitted via antenna arrays 1340, or vice versa. The RF module 1330 can include a digital to analog converter (DAC), an analog to digital converter (ADC), a frequency up converter, a frequency down converter, filters and amplifiers for reception and transmission operations. The RF module 1330 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1340 can include one or more antenna arrays.

The apparatus 1300 can optionally include other components, such as input and output devices, additional or signal processing circuitry, and the like. Accordingly, the apparatus 1300 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of a relay user equipment (UE), comprising:
receiving, at the relay UE, from a first neighbor UE, a communication request message for establishing a connection between an initiating UE and a target UE, the communication request message including first security-establishment-related information originating from the initiating UE for establishing a security association between the initiating UE and the target UE;
modifying the communication request message to add second security-establishment-related information for establishing a security association between the relay UE and a second neighbor UE; and
transmitting to the second neighbor UE the modified communication request message that includes
the first security-establishment-related information originating from the initiating UE for establishing the security association between the initiating UE and the target UE, and
the second security-establishment-related information added by the relay UE for establishing the security association between the relay UE and the second neighbor UE.

2. The method of claim 1, wherein the first neighbor UE is the initiating UE, and the method further comprises:
performing an authentication based on the first security-establishment-related information originating from the initiating UE to determine a root key for communications between the first neighbor UE and the relay UE; and
initiating a security mode control process based on the first security-establishment-related information originating from the initiating UE to establish a security association between the first neighbor UE and the relay UE.

3. The method of claim 1, wherein the communication request message includes third security-establishment-related information originating from the first neighbor UE for establishing a security association between the first neighbor UE and the relay UE, and
the modifying comprises:
replacing the third security-establishment-related information originating from the first neighbor UE with the second security-establishment-related information for establishing the security association between the relay UE and the second neighbor UE.

4. The method of claim 3, further comprising:
performing an authentication based on the third security-establishment-related information originating from the first neighbor UE to determine a root key for communications between the first neighbor UE and the relay UE; and
initiating a security mode control process based on the third security-establishment-related information originating from the first neighbor UE to establish a security association between the first neighbor UE and the relay UE.

5. The method of claim 1, further comprising:
in response to receiving a request of a security mode control process from the second neighbor UE, initiating a security mode control process to establish a security association between the first neighbor UE and the relay UE based on one of
the first security-establishment-related information originating from the initiating UE, and
third security-establishment-related information originating from the first neighbor UE and included in the communication request message.

6. The method of claim 1, wherein the first security-establishment-related information originating from the initiating UE includes first user information of the initiating UE, a first nonce generated at the initiating UE, and a first signature covering the first user information of the initiating UE and the first nonce generated at the initiating UE, and
the second security-establishment-related information added by the relay UE includes second user information of the relay UE, a second nonce generated at the relay UE, and a second signature covering the second user information of the relay UE and the second nonce generated at the relay UE.

7. The method of claim 6, wherein the communication request message includes third security-establishment-related information originating from the first neighbor UE for establishing a security association between the first neighbor UE and the relay UE,
the third security-establishment-related information originating from the first neighbor UE includes third user information of the first neighbor UE, a third nonce generated at the first neighbor UE, and a third signature covering the third user information of the first neighbor UE and the third nonce generated at the first neighbor UE, and
the modifying comprises:
replacing the third nonce and the third signature covering the third user information of the first neighbor UE and the third nonce with the second nonce and the second signature covering the second user information of the relay UE and the second nonce.

8. The method of claim 6, further comprising:
authenticating the first neighbor UE based on one of
the first signature covering the first user information of the initiating UE and the first nonce generated at the initiating UE, and
a third signature covering a third user of the first neighbor UE and a third nonce generated at the first neighbor UE.

9. The method of claim 6, further comprising:
transmitting to the first neighbor UE a security mode command message that includes
a root key for communications between the first neighbor UE and the relay UE,
a fourth nonce generated at the relay UE for a connection between the first neighbor UE and the relay UE, and a fourth signature covering the fourth nonce generated at the relay UE for the connection between the first neighbor UE and the relay UE.

10. The method of claim 9, further comprising:
deriving a session key for the connection between the first neighbor UE and the relay UE based on
the root key for communications between the first neighbor UE and the relay UE,
the fourth nonce generated at the relay UE for the connection between the first neighbor UE and the relay UE, and
one of the first nonce generated at the initiating UE and a third nonce generated at the first neighbor UE.

11. The method of claim 6, further comprising:
receiving from the second neighbor UE a security mode command message that includes
a root key for communications between the second neighbor UE and the relay UE,
a fifth nonce generated at the second neighbor UE for a connection between the second neighbor UE and the relay UE, and
a fifth signature covering the fifth nonce generated at the second neighbor UE for the connection between the second neighbor UE and the relay UE; and
authenticating the second neighbor UE based on the fifth signature covering the fifth nonce generated at the second neighbor UE for the connection between the second neighbor UE and the relay UE.

12. The method of claim 11, further comprising:
deriving a session key for the connection between the second neighbor UE and the relay UE based on
the root key for communications between the second neighbor UE and the relay UE,
the fifth nonce generated at the second neighbor UE for the connection between the second neighbor UE and the relay UE, and
the second nonce generated at the relay UE.

13. The method of claim 1, wherein the second neighbor UE is the target UE.

14. A method of a target user equipment (UE), comprising:
receiving, at the target UE from a relay UE, a communication request message for establishing a connection between an initiating UE and the target UE via the relay UE, the communication request message including
first security-establishment-related information initiated from the initiating UE for establishing a security association between the initiating UE and the target UE, and
second security-establishment-related information originating from the relay UE for establishing a security association between the relay UE and target UE;
establishing a secure connection between the relay UE and the target UE based on the second security-establishment-related information originating from the relay UE;
performing an authentication based on the first security-establishment-related information originating from the initiating UE to determine a root key for communications between the initiating UE and the target UE; and
initiating a security mode control process with the initiating UE based on the first security-establishment-related information originating from the initiating UE to establish a security association between the initiating UE and the target UE, wherein a security mode control command message for the initiating UE is transmitted to the relay UE over the secure connection between the relay UE and the target UE.

15. The method of claim 14, wherein the first security-establishment-related information originating from the initiating UE includes a first user information of the initiating UE, a first nonce generated at the initiating UE, and a first signature covering the first user information of the initiating UE and the first nonce generated at the initiating UE, and
the second security-establishment-related information originating from the relay UE includes second user information of the relay UE, a second nonce generated at the relay UE, and a second signature covering the second user information of the relay UE and the second nonce generated at the relay UE.

16. The method of claim 15, wherein the establishing includes:
authenticating the relay UE based on the second signature covering the second user information of the relay UE and the second nonce generated at the relay UE;
determining a root key for communications between the relay UE and the target UE;
determining a session key for the secure connection between the relay UE and the target UE based on the second nonce generated at the relay UE, a third nonce generated at the target UE, and the root key; and
transmitting to the relay UE a security mode control command message that includes the third nonce generated at the target UE, a third signature covering the third nonce generated at the target UE, and the root key that is encrypted.

17. The method of claim 15, wherein the performing the authentication includes:
authenticating the initiating UE based on the first signature covering the first user information of the initiating UE and the first nonce generated at the initiating UE; and
determining a root key for communications between the initiating UE and the target UE.

18. The method of claim 17, wherein the security mode control command message for the initiating UE includes:
a fourth nonce generated at the target UE, a fourth signature covering the fourth nonce generated at the target UE, and the root key that is encrypted.

19. The method of claim 18, further comprising:
determining a session key for a connection between the initiating UE and the target UE based on the first nonce generated at the initiating UE, the fourth nonce generated at the target UE, and the root key for communications between the initiating UE and the target UE.

20. A relay user equipment (UE), comprising circuitry configured to:
receive, at the relay UE, from a first neighbor UE, a communication request message for establishing a connection between an initiating UE and a target UE, the communication request message including first security-establishment-related information originating from the initiating UE for establishing a security association between the initiating UE and the target UE;
modify the communication request message to add second security-establishment-related information for establishing a security association between the relay UE and a second neighbor UE; and
transmit to the second neighbor UE the modified communication request message that includes the first security-establishment-related information originating from the initiating UE for establishing the security association between the initiating UE and the target UE, and the second security-establishment-related information added by the relay UE for establishing the security association between the relay UE and the second neighbor UE.

* * * * *